(12) United States Patent
Simon et al.

(10) Patent No.: US 12,143,893 B2
(45) Date of Patent: Nov. 12, 2024

(54) SYSTEM AND METHOD FOR DETERMINING WHEN SMARTPHONE IS IN VEHICLE

(71) Applicant: Sfara, Inc., Hoboken, NJ (US)

(72) Inventors: Sascha Simon, Warwick, NY (US); Emiliano Miluzzo, Madison, NJ (US)

(73) Assignee: Sfara, Inc., Hoboken, NJ (US)

( * ) Notice: Subject to any disclaimer, the term of this patent is extended or adjusted under 35 U.S.C. 154(b) by 1034 days.

(21) Appl. No.: 15/806,915

(22) Filed: Nov. 8, 2017

(65) Prior Publication Data

US 2021/0314733 A1 Oct. 7, 2021

Related U.S. Application Data

(63) Continuation-in-part of application No. 14/095,156, filed on Dec. 3, 2013, now abandoned.

(51) Int. Cl.
*H04W 4/029* (2018.01)
*G01S 19/52* (2010.01)
*H04W 4/40* (2018.01)

(52) U.S. Cl.
CPC ............ *H04W 4/029* (2018.02); *G01S 19/52* (2013.01); *H04W 4/40* (2018.02)

(58) Field of Classification Search
CPC .......... H04W 4/029; H04W 4/40; G01S 19/52
See application file for complete search history.

(56) References Cited

U.S. PATENT DOCUMENTS

| 5,072,380 A | 12/1991 | Randelman et al. |
| 5,785,347 A | 7/1998 | Adolph et al. |
| 6,389,010 B1 | 5/2002 | Kubler et al. |

(Continued)

FOREIGN PATENT DOCUMENTS

| CN | 1532098 A | 9/2004 |
| CN | 101583075 A | 11/2009 |

(Continued)

OTHER PUBLICATIONS

International Search Report and Written Opinion for International Patent Application PCT/US2013/076410, date of mailing Apr. 7, 2014, 11 pages.

(Continued)

*Primary Examiner* — Muthuswamy G Manoharan
(74) *Attorney, Agent, or Firm* — Christopher J. Volkmann; Kelly, Holt & Christenson, PLLC.

(57) ABSTRACT

A device includes a triggering parameter detecting component, a velocity determining component, a comparing component and a mode-determining component. The triggering parameter detecting component detects, over a predetermined period of time, a triggering parameter associated with an in-vehicle mode of operation and generates a triggering detector signal based on the triggering detected parameter over the predetermined period of time. The velocity determining component determines a velocity of the device based on the generated triggering detector signal. The comparing component generates a compared signal when the detected velocity is greater than a predetermined velocity threshold. The mode-determining component generates an in-vehicle mode signal based on the compared signal.

11 Claims, 11 Drawing Sheets

(56) References Cited

U.S. PATENT DOCUMENTS

| | | |
|---|---|---|
| 6,411,250 B1 | 6/2002 | Oswald et al. |
| 6,791,471 B2 | 9/2004 | Wehner et al. |
| 6,985,089 B2 | 1/2006 | Liu et al. |
| 7,136,828 B1 | 11/2006 | Allen et al. |
| 7,236,878 B2 | 6/2007 | Watanabe |
| 7,415,126 B2 | 8/2008 | Breed et al. |
| 7,904,053 B2 | 3/2011 | Krasner et al. |
| 8,082,014 B2 | 12/2011 | Causey et al. |
| 8,099,232 B2 | 1/2012 | Tanaka et al. |
| 8,290,480 B2 | 10/2012 | Abramson et al. |
| 8,417,268 B1 | 4/2013 | Halferty et al. |
| 8,509,812 B2 | 8/2013 | Fong et al. |
| 8,731,530 B1 | 5/2014 | Breed et al. |
| 8,793,036 B2 | 7/2014 | Koon et al. |
| 8,868,330 B2 | 10/2014 | Park et al. |
| 8,989,952 B2 | 3/2015 | Simon |
| 9,037,407 B2 | 5/2015 | Thompson |
| 9,286,783 B1 | 3/2016 | Teller et al. |
| 9,311,271 B2 | 4/2016 | Wright |
| 9,329,048 B2 | 5/2016 | Yakali |
| 9,333,946 B2 | 5/2016 | Simon |
| 9,338,605 B2 * | 5/2016 | Guba .................. H04W 4/027 |
| 9,390,625 B2 | 7/2016 | Green et al. |
| 9,414,221 B1 | 8/2016 | Simon et al. |
| 9,466,219 B1 | 10/2016 | Stefani et al. |
| 9,593,463 B1 | 3/2017 | Hiranaka |
| 9,598,009 B2 | 3/2017 | Christensen et al. |
| 9,646,427 B2 * | 5/2017 | Chen .................... G07C 5/008 |
| 9,725,037 B2 | 8/2017 | Goudy et al. |
| 9,776,630 B2 | 10/2017 | Goudy et al. |
| 9,842,501 B2 | 12/2017 | Osagawa |
| 9,867,035 B2 | 1/2018 | Simon et al. |
| 10,002,462 B2 | 6/2018 | Seo et al. |
| 10,019,012 B2 | 7/2018 | Rylander |
| 10,037,698 B2 | 7/2018 | Damiani et al. |
| 10,152,891 B2 | 12/2018 | Rusciolelli et al. |
| 10,248,128 B2 | 4/2019 | Tanaka et al. |
| 10,407,873 B2 | 9/2019 | Ono |
| 10,480,157 B2 | 11/2019 | Friend et al. |
| 10,551,848 B2 | 2/2020 | Ogihara et al. |
| 10,565,873 B1 | 2/2020 | Christensen |
| 10,831,195 B2 | 11/2020 | Ito |
| 11,222,534 B2 | 1/2022 | Simon |
| 11,350,237 B2 | 5/2022 | Simon |
| 2001/0044697 A1 | 11/2001 | Kageyama |
| 2003/0029345 A1 | 2/2003 | Tiernan et al. |
| 2003/0209893 A1 | 11/2003 | Breed et al. |
| 2004/0152471 A1 | 8/2004 | MacDonald et al. |
| 2004/0257208 A1 | 12/2004 | Huang et al. |
| 2006/0085153 A1 | 4/2006 | Oesterling et al. |
| 2006/0089153 A1 | 4/2006 | Sheynblat |
| 2007/0021915 A1 | 1/2007 | Breed et al. |
| 2007/0120697 A1 | 5/2007 | Ayoub et al. |
| 2008/0040004 A1 | 2/2008 | Breed |
| 2008/0203814 A1 | 8/2008 | Kamiya |
| 2008/0287143 A1 | 11/2008 | Banks et al. |
| 2009/0037056 A1 | 2/2009 | Erb |
| 2009/0073070 A1 | 3/2009 | Rofougaran |
| 2009/0309709 A1 | 12/2009 | Bevacqua et al. |
| 2010/0035632 A1 | 2/2010 | Catten |
| 2010/0063649 A1 | 3/2010 | Wu et al. |
| 2010/0113073 A1 | 5/2010 | Schlesener et al. |
| 2010/0234047 A1 | 9/2010 | Lipovski |
| 2010/0273522 A1 | 10/2010 | Ota et al. |
| 2010/0285827 A1 | 11/2010 | Kim et al. |
| 2011/0012775 A1 | 1/2011 | Richards et al. |
| 2011/0039572 A1 | 2/2011 | Lamb et al. |
| 2011/0076996 A1 | 3/2011 | Burton et al. |
| 2011/0169654 A1 | 7/2011 | Ketari |
| 2011/0224870 A1 | 9/2011 | Tan |
| 2011/0301795 A1 | 12/2011 | Failing |
| 2012/0021777 A1 | 1/2012 | Lazaridis et al. |
| 2012/0040665 A1 | 2/2012 | Liu et al. |
| 2012/0119936 A1 | 5/2012 | Miller et al. |
| 2012/0123634 A1 | 5/2012 | Shimizu |
| 2012/0135764 A1 | 5/2012 | Ohashi |
| 2012/0139760 A1 | 6/2012 | Bevacqua et al. |
| 2012/0158249 A1 | 6/2012 | Xu et al. |
| 2012/0208517 A1 | 8/2012 | Zohar |
| 2012/0231773 A1 | 9/2012 | Lipovski |
| 2012/0282885 A1 | 11/2012 | Hamed et al. |
| 2012/0299713 A1 | 11/2012 | Elia et al. |
| 2012/0313770 A1 | 12/2012 | Zeiger et al. |
| 2012/0327894 A1 | 12/2012 | Axmon et al. |
| 2013/0130639 A1 | 5/2013 | Oesterling et al. |
| 2013/0173374 A1 | 7/2013 | Weiss |
| 2013/0253775 A1 | 9/2013 | Shimizu |
| 2013/0281079 A1 | 10/2013 | Vidal et al. |
| 2013/0293394 A1 | 11/2013 | Rubin et al. |
| 2013/0344859 A1 | 12/2013 | Abramson et al. |
| 2014/0087708 A1 * | 3/2014 | Kalita .................. H04W 4/40 |
| | | 455/418 |
| 2014/0162616 A1 | 6/2014 | Bradley |
| 2014/0179348 A1 | 6/2014 | Simon |
| 2014/0179353 A1 | 6/2014 | Simon |
| 2014/0180563 A1 | 6/2014 | Simon |
| 2014/0180615 A1 | 6/2014 | Simon |
| 2014/0248864 A1 | 9/2014 | Rangarajan et al. |
| 2014/0256303 A1 | 9/2014 | Jones |
| 2014/0274020 A1 | 9/2014 | Miller |
| 2014/0364153 A1 | 12/2014 | Ren |
| 2014/0370919 A1 * | 12/2014 | Cordova ............... H04W 4/029 |
| | | 455/456.1 |
| 2015/0004956 A1 | 1/2015 | Aksamit |
| 2015/0011249 A1 | 1/2015 | Siliski et al. |
| 2015/0029016 A1 | 1/2015 | Lesesky et al. |
| 2015/0148019 A1 | 5/2015 | Michaelis |
| 2015/0172450 A1 | 6/2015 | Singhal |
| 2015/0181414 A1 | 6/2015 | Bretscher et al. |
| 2015/0193989 A1 | 7/2015 | Simon et al. |
| 2015/0360523 A1 | 12/2015 | Simon et al. |
| 2015/0364040 A1 | 12/2015 | Simon et al. |
| 2015/0365785 A1 | 12/2015 | Simon et al. |
| 2016/0050310 A1 | 2/2016 | Bleggi et al. |
| 2020/0037133 A1 * | 1/2020 | Kusumoto ............. G01S 13/76 |
| 2021/0314733 A1 | 10/2021 | Simon et al. |
| 2022/0084404 A1 | 3/2022 | Simon |
| 2023/0010292 A1 | 1/2023 | Simon |

FOREIGN PATENT DOCUMENTS

| | | |
|---|---|---|
| CN | 101655369 A | 2/2010 |
| CN | 101808276 A | 8/2010 |
| CN | 201590159 U | 9/2010 |
| CN | 102050083 A | 5/2011 |
| CN | 102143433 A | 8/2011 |
| CN | 102177750 A | 9/2011 |
| CN | 102252675 A | 11/2011 |
| CN | 102257873 A | 11/2011 |
| CN | 102469580 A | 5/2012 |
| DE | 102016201929 A1 | 8/2017 |
| EP | 0461688 A1 | 12/1991 |
| EP | 0461888 A2 | 12/1991 |
| JP | 10260241 A | 9/1998 |
| JP | 2007183865 A | 7/2007 |
| JP | 2008-207714 A | 9/2008 |
| JP | 2009177758 A | 8/2009 |
| KR | 1020030023855 A | 3/2003 |
| KR | 1020100031696 A | 3/2010 |
| WO | 2003095276 A1 | 11/2003 |
| WO | WO 2007107368 A1 | 9/2007 |
| WO | WO 2013190380 A2 | 12/2013 |

OTHER PUBLICATIONS

International Search Report and Written Opinion for International Patent Application PCT/US2013/076440, date of mailing Apr. 9, 2014, 10 pages.

International Search Report and Written Opinion for International Patent Application PCT/US2013/076432, date of mailing Apr. 9, 2014, 12 pages.

(56) References Cited

OTHER PUBLICATIONS

International Search Report and Written Opinion for International Patent Application PCT/US2013/076426, date of mailing Apr. 9, 2014, 12 pages.
Advisory Action for U.S. Appl. No. 14/105,934, date of mailing May 2, 2017, 3 pages.
Final Office Action for U.S. Appl. No. 14/105,934, date of mailing Jun. 8, 2021, 11 pages.
Final Office Action for U.S. Appl. No. 14/105,934, date of mailing Jan. 6, 2017, 12 pages.
Non-Final Office Action for U.S. Appl. No. 14/105,934, date of mailing Jun. 11, 2020, 12 pages.
Non-Final Office Action for U.S. Appl. No. 14/105,934, date of mailing May 18, 2016, 16 pages.
Notice of Allowance for U.S. Appl. No. 14/105,934, date of mailing Feb. 2, 2022, 11 pages.
Final Office Action for U.S. Appl. No. 15/806,915, date of mailing May 20, 2022, 9 pages.
Non-Final Office Action for U.S. Appl. No. 15/806,915, date of mailing Sep. 1, 2022, 8 pages.
Non-Final Office Action for U.S. Appl. No. 15/806,915, date of mailing Sep. 28, 2021, 7 pages.
Notice of Allowance for U.S. Appl. No. 14/072,231, date of mailing Mar. 25, 2016, 8 pages.
Non-Final Office Action for U.S. Appl. No. 14/105,744, date of mailing Nov. 6, 2014, 13 pages.
Notice of Allowance for U.S. Appl. No. 14/105,744, date of mailing Jan. 28, 2015, 8 pages.
Non-Final Office Action for U.S. Appl. No. 16/114,393, date of mailing Feb. 19, 2021, 18 pages.
Notice of Allowance for U.S. Appl. No. 16/114,393, date of mailing Nov. 5, 2021, 13 pages.
Non-Final Office Action for U.S. Appl. No. 14/664,409, date of mailing Dec. 8, 2015, 10 pages.
Notice of Allowance for U.S. Appl. No. 14/664,409, date of mailing Jun. 7, 2016, 7 pages.
Non-Final Office Action for U.S. Appl. No. 15/230,442, date of mailing Nov. 22, 2016, 4 pages.
Final Office Action for U.S. Appl. No. 15/230,442, date of mailing Jun. 26, 2017, 6 pages.
Notice of Allowance for U.S. Appl. No. 15/230,442, date of mailing Oct. 13, 2017, 5 pages.
First Office Action for Chinese Patent Application No. 201380073529.X dated Oct. 28, 2016, 17 pages with English Translation.
First Office Action for Chinese Patent Application No. 201380073520.9 dated Jul. 6, 2016, 21 pages with English Translation.
Second Office Action for Chinese Patent Application No. 201380073520.9 dated Mar. 10, 2017, 11 pages with English Translation.
First Examination Report for Australian Patent Application No. 2013361332 dated Dec. 2, 2015, 2 pages.
First Office Action for Chinese Patent Application No. 201380073530.2 dated Oct. 31, 2016, 9 pages with English Translation.
Request for the Submission of an Opinion for Korean Patent Application No. 10-2015-7019887 dated Apr. 11, 2016, 5 pages with English Translation.
Written Opinion for Korean Patent Application No. 10-2015-7019887 dated Oct. 11, 2016, 8 pages with English Translation.
Request for the Submission of an Opinion for Korean Patent Application No. 10-2015-7019887 dated Feb. 28. 2017, 9 pages with English Translation.
Written Opinion for Korean Patent Application No. 10-2015-7019887 dated May 2, 2017, 16 pages with English Translation.
First Examination Report for Australian Patent Application No. 2013361342 dated Nov. 20, 2015, 3 pages.
First Office Action for Chinese Patent Application No. 201380073521.3 dated Jul. 26, 2016, 8 pages with English Translation.
Second Office Action for Chinese Patent Application No. 201380073521.3 dated Jan. 19, 2017, 8 pages with English Translation.
Request for the Submission of an Opinion for Korean Patent Application No. 10-2015-7019401 dated Apr. 27, 2016, 9 pages with English Translation.
Written Opinion for Korean Patent Application No. 10-2015-7019401 dated Sep. 27, 2016, 11 pages with English Translation.
Request for the Submission of an Opinion for Korean Patent Application No. 10-2015-7019401 dated Feb. 17, 2017, 4 pages with English Translation.
Written Opinion for Korean Patent Application No. 10-2015-7019401 dated Apr. 17, 2017, 7 pages with English Translation.
Search Report for European Patent Application No. 17207356.1 dated Jul. 24, 2018, 12 pages.
First Examination Report for Australian Patent Application No. 2013361346 dated Nov. 19, 2015, 3 pages.
Request for the Submission of an Opinion for Korean Patent Application No. 10-2015-7019726 dated Dec. 12, 2016, 9 pages with English Translation.
Written Opinion for Korean Patent Application No. 10-2015-7019726 dated Feb. 13, 2017, 9 pages with English Translation.
Request for the Submission of an Opinion for Korean Patent Application No. 10-2015-7019726 dated Jun. 22, 2017, 4 pages with English Translation.
Written Opinion for Korean Patent Application No. 10-2015-7019726 dated Aug. 22, 2017, 6 pages with English Translation.
First Examination Report for Australian Patent Application No. 2013361351 dated Apr. 12, 2016, 2 pages.
Request for the Submission of an Opinion for Korean Patent Application No. 10-2015-7019383 dated Aug. 10, 2017, 9 pages with English Translation.
Written Opinion for Korean Patent Application No. 10-2015-7019383 dated Jan. 9, 2018, 12 pages with English Translation.
Prosecution History for U.S. Appl. No. 14/136,467 including: Notice of Allowance dated May 18, 2018, Notice of Appeal dated Dec. 21, 2017, Advisory Action dated Dec. 7, 2017, Final Office Action dated Jun. 21, 2017, Non-Final Office Action dated Dec. 19, 2016, Final Office Action dated May 19, 2016, and Non-Final Office Action dated Oct. 6, 2015, 51 pages.
Non-Final Office Action for U.S. Appl. No. 14/818,802 dated Aug. 24, 2017, 7 pages.
Prosecution History for U.S. Appl. No. 14/818,735 including: Non-Final Office Action dated Mar. 27, 2018, and Non-Final Office Action dated Aug. 31, 2017, 15 pages.
Non-Final Office Action for U.S. Appl. No. 14/818,648 dated Apr. 17, 2018, 11 pages.
Prosecution History for U.S. Appl. No. 14/095,156 including: Advisory Action dated Oct. 18, 2018, Final Office Action dated Apr. 18, 2018, Non-Final Office Action dated Nov. 1, 2017, Final Office Action dated Apr. 11, 2017, Non-Final Office Action dated Aug. 18, 2016, Advisory Action dated Apr. 27, 2016, Final Office Action dated Nov. 16, 2015, and Non-Final Office Action dated Jul. 27, 2015, 56 pages.
Prosecution History for U.S. Appl. No. 14/664,424 including: Final Office Action dated May 9, 2018 and Non-Final Office Action dated Jun. 29, 2017, 36 pages.
Fleming, Overview of Automotive Sensors, IEEE Sensors Journal, vol. 1. No. 4, Dec. 2001.
Halgamuge et al, Measurement and Analysis of Electromagnetic Fields From Trams, Trains, and Hybrid Cars, Radiation Protection Dosimetry (2010), vol. 141, No. 3, DOI: 10.1093.
Ahn et al. Low Frequency, Electromagnetic Field Reduction Techniques for the On-Line Electric Vehicle, 2010 IEEE International Symposium on Electromagnetic Compatibility, Fort Lauderdale, FL, USA, 2010, pp. 625-630, doi: 10.1109/ISEMC.2010.5711349.
Fazeen et al., Safe Driving Using Mobile Phones, IEEE Transactions on Intelligent Transportation Systems (vol. 13, Issue: 3. Sep. 2012).
Mohan et al., TrafficSense: Rich Monitoring of Road and Traffic Conditions using Mobile Smartphones. Microsoft Research, Apr. 2008.
Vukajlovic et al., The Practical Design of In-vehicle Telematics Device with GPS and MEMS Accelerometers, Telfor Journal, vol. 4, No. 2, 2012.

(56) References Cited

OTHER PUBLICATIONS

Yilin Zhao, Telematics: Safe and Fun Driving, IEEE Intelligent Systems 2002.

Cook et al., Control, computing and communications: technologies for the twenty-first century model T. Proceedings of the IEEE. Vol. 95, Issue: 2, Feb. 2007.

Ching-Yao Chan, A treatise on crash sensing for automotive air bag systems, IEEE/ASME Transactions on Mechatronics. Vol. 7, Issue. 2, Jun. 2002.

Shaout et al., Automotive airbag technology: past, present and future, International Journal of Computer Applications in Technology vol. 13, No. 3-5. Jan. 1, 2000.

Cech et al., Active Magnetic Field Based Sensing System for Improved Detection and Discrimination of Side Impact Crashes, Proceedings - 19th International Technical Conference on the Enhanced Safety of Vehicles (ESV), Washington, D.C., Jun. 6-9, 2005, Paper No. 05-0406.

Bell, Policy issues for the future intelligent road transport infrastructure, IEE Proceedings—Intelligent Transport Systems, vol. 153, Issue 2, Jun. 2006, p. 147-155.

Hull et al., CarTel: a distributed mobile sensor computing system, SenSys '06: Proceedings of the 4th international conference on Embedded networked sensor systems, Oct. 2006. p. 125-138. https://doi.org/10.1145/1182807.1182821.

Dai et al., Mobile phone based drunk driving detection, 2010 4th International Conference on Pervasive Computing Technologies for Healthcare, IEEE, Jun. 2010, DOI: 10.4108/ICST.PERVASIVEHEALTH2010.8901.

Thompson et al., Using Smartphones to Detect Car Accidents and Provide Situational Awareness to Emergency Responders. In; Cai, Y., Magedanz, T., Li, M., Xia, J., Giannelli, C. (eds) Mobile Wireless Middleware, Operating Systems, and Applications. MOBILWARE 2010. Lecture Notes of the Institute for Computer Sciences, Social Informatics and Telecommunications Engineering, vol. 48. Springer, Berlin, Heidelberg. https://doi.org/10.1007/978-3-642-17758-3_3 ("Thompson 2010").

Johnson et al., Driving Style Recognition Using a Smartphone as a Sensor Platform. 2011 14th International IEEE Conference on Intelligent Transportation Systems, IEEE, Nov. 2011, DOI: 10.1109/ITSC.2011.6083078.

Mednis et al., Real time pothole detection using Android smartphones with accelerometers, 2011 International Conference on Distributed Computing in Sensor Systems and Workshops, IEEE, Aug. 2011, DOI: 10.1109/DCOSS.2011.5982206.

Eren et al., Estimating driving behavior by a smartphone, 2012 IEEE Intelligent Vehicles Symposium, IEEE. Jul. 2012, DOI: 10.1109/IVS.2012.6232298.

Petition for Inter Partes Review (IPR2024-00952) of U.S. Pat. No. 8,989,952 dated Jun. 5, 2024. 113 pages.

Petition for Inter Partes Review (IPR2024-00966) of U.S. Pat. No. 9,333,946 dated Jun. 6, 2024, 116 pages.

\* cited by examiner

SYSTEM AND METHOD FOR DETERMINING WHEN SMARTPHONE IS IN VEHICLE

The present application is a continuation-in-part of U.S. application Ser. No. 14/095,156 filed Dec. 3, 2013, the entire disclosure of which is incorporated herein by reference.

TECHNICAL FIELD

Various embodiments described herein relate generally to methods and apparatus utilizing the output of sensors and other functionality embedded in smartphones and, more particularly, to methods and apparatus for determining the identity, the type and class of vehicle a Smartphone is in.

BACKGROUND

Vehicle telematics is the technology of sending, receiving and storing information to and from vehicles and is generally present (at least to a limited extent) in the automotive marketplace today. For example, both General Motors (through their OnStar offering) and Mercedes Benz (through their Tele-Aid and more recent mbrace system offering) have long offered connected-vehicle functionality to their customers. Both of these offerings make use of the data available on a vehicle's CAN bus, which is specified in the OBD-II vehicle diagnostics standard. For example, the deployment of an airbag, which suggests that the vehicle has been involved in a crash, may be detected by monitoring the CAN bus. In this event, a digital wireless telephony module that is embedded in the vehicle and connected to the vehicle's audio system (i.e., having voice connectivity) can initiate a phone call to a telematics service provider (TSP) to "report" the crash. Vehicle location may also be provided to the TSP using the vehicle's GPS functionality. Once the call is established, the TSP representative may attempt to communicate with the vehicle driver, using the vehicle's audio system, to assess the severity of the situation. Assistance may thus be dispatched by the TSP representative to the vehicle as appropriate.

Historically, these services were focused entirely on driver and passenger safety. These types of services have expanded since their initial roll-out, however, and now offer additional features to the driver, such as concierge services. The services, however, remain mainly focused on voice based driver to call center communication, with data services being only slowly introduced, hindered by low bandwidth communication modules, high cost and only partial availability on some model lines.

As a result, while generally functional, vehicle telematics services have experienced only limited commercial acceptance in the marketplace. There are several reasons for this. In addition to low speeds and bandwidth, most vehicle drivers (perhaps excluding the premium automotive market niche) are reluctant to pay extra for vehicle telematics services, either in the form of an upfront payment (i.e., more expensive vehicle) or a recurring (monthly/yearly) service fee. Moreover, from the vehicle manufacturer's perspective, the services require additional hardware to be embedded into the vehicle, resulting in extra costs on the order of $250 to $350 or more per vehicle which cannot be recouped. Thus, manufacturers have been slow to fully commit to or invest in the provision of vehicle telematics equipment in all vehicles.

There have been rudimentary attempts in the past to determine when a smartphone is in a moving vehicle. Wireless service provider AT&T, Sprint and Verizon, for example, offer a smartphone application that reacts in a specific manner to incoming text messages and voice calls when a phone is in what AT&T calls DriveMode™. With the AT&T DriveMode application, a wireless telephone is considered to be in "drive mode" when one of two conditions are met. First, the smartphone operator can manually turn on the application, i.e., she "tells" the application to enter drive mode. Alternatively, when the DriveMode application is in automatic on/off mode and the smartphone GPS sensor senses that the smartphone is travelling at greater than 25 miles per hour, the GPS sensor so informs the DriveMode application, the DriveMode application concludes that the smartphone is in a moving vehicle, and drive mode is entered.

Both of these paths to engaging the AT&T DriveMode application—the "manual" approach to entering drive mode and the "automatic" approach to entering drive mode—are problematic. First, if the smartphone operator forgets or simply chooses not to launch the DriveMode application prior to driving the vehicle when the application is in manual mode then the application will not launch. Second, in automatic on/off mode AT&T's use of only the GPS sensor to determine when a smartphone is in a moving vehicle is problematic for a number of reasons. First, the speed threshold of the application is arbitrary, meaning that drive mode will not be detected/engaged at less than 25 mph. If the vehicle is stopped in traffic or at a traffic signal, for example, then the DriveMode application may inadvertently terminate. Second, and perhaps more importantly, AT&T's DriveMode application requires that the smartphone's GPS functionality be turned on at all times. Because the use of a smartphone's GPS sensor is extremely demanding to the battery resources of a smartphone, this requirement severely undermines the usefulness of AT&T's application. Thirdly this method does not differentiate between the type of vehicle that the phone is in, e.g. a bus, a taxi or a train and therefore allows no correlation between the owner of the phone and her driving situation. For the classic embedded telematics devices to be replaces by smartphones it is important to correlate the driver and smartphone owner with her personal vehicle. Only then the smartphone can truly take the functional role of an embedded telematics device in a vehicle.

Accordingly, for at least the foregoing reasons there exists a need and it is an object of the present invention to provide an improved method and apparatus of determining the location of a smartphone so that a specific mode of operation may be activated.

SUMMARY

The present invention provides an improved method and apparatus of determining the specific location of a smartphone such that a specific mode of operation may be enacted.

Various embodiments described herein are drawn to a device that includes a triggering parameter detecting component, a velocity determining component, a comparing component and a mode-determining component. The triggering parameter detecting component detects, over a predetermined period of time, a triggering parameter associated with an in-vehicle mode of operation and generates a triggering detector signal based on the triggering detected parameter over the predetermined period of time. The velocity determining component determines a velocity of the device based on the generated triggering detector signal. The comparing component generates a compared signal when the detected velocity is greater than a predetermined velocity threshold. The mode-determining component generates an in-vehicle mode signal based on the compared signal.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the present invention are drawn to a system and method for determining a specific location by utilizing field properties within and/or near the specific location.

As used herein, the term "smartphone" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or other devices that can include a radio frequency transceiver and a pager, Internet/Intranet access, Web browser, organizer, calendar and/or a global positioning system (GPS) receiver; and/or conventional laptop (notebook) and/or palmtop (netbook) computer(s), tablet(s), or other appliance(s), which include a radio frequency transceiver. As used herein, the term "smartphone" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more location(s).

In accordance with aspects of the present invention a location may be identified by a communication device, e.g., a smartphone. The location may be identified by detecting at least two parameters, generating a signature based on the detected parameters, and comparing the generated signature with another signature associated with a known location. Once the location is identified, the communication device may operate in a predetermined mode based on the location. In one non-limiting example embodiment, a smartphone may detect a magnetic field and another parameter to determine whether the smartphone is in a vehicle and then operate in a vehicle mode.

These aspects will now be described in more detail with reference to FIGS. 1-11.

Figure 1:
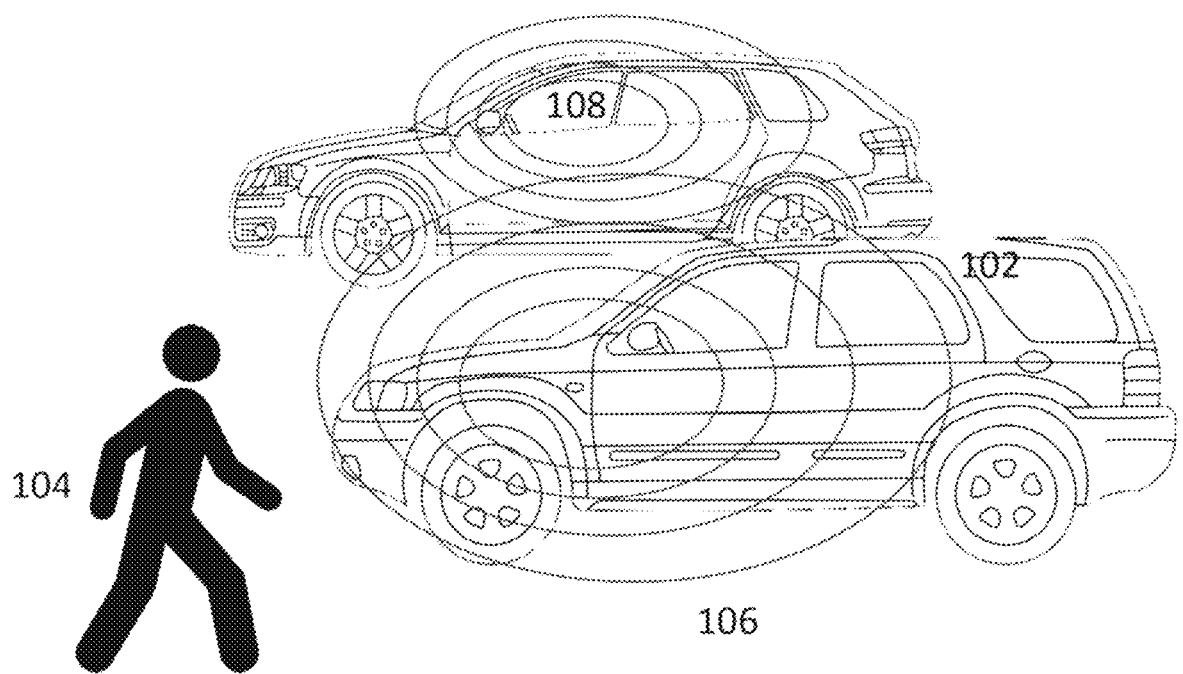
FIG. 1 illustrates a person walking towards a vehicle.

FIG. 1 illustrates a person 104 walking towards a vehicle 102. A magnetic field 106 is located near vehicle 102 and ambient noise 108 is additionally present vehicle 102. In accordance with aspects of the present invention, parameters such as magnetic field 106 and ambient noise 108 may be detected by a device of person 104 in order to identify his location. The mode of operation of the device may be modified based on the detected location.

Figure 2:
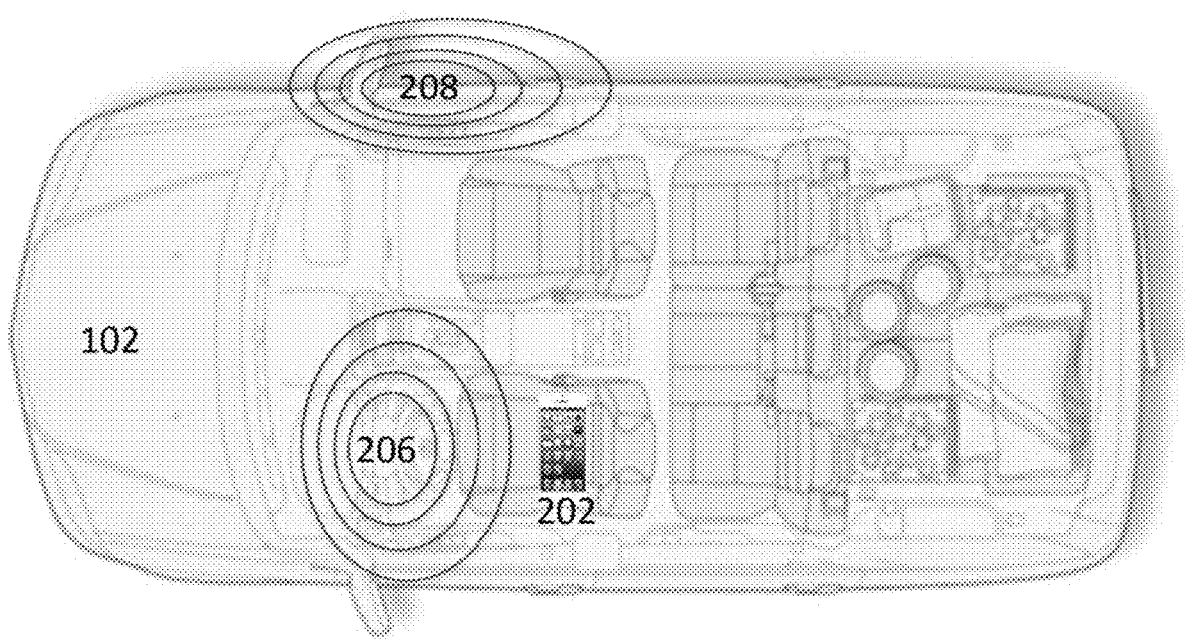
FIG. 2 is a planar view of an interior of a vehicle.

FIG. 2 is a planar view of an interior of vehicle 102. A position 202 represents the location of a smartphone within vehicle 102. A superposition of magnetic fields at position 202 is represented by field lines 206. A superposition of sound at position 202 is represented by lines 208. Again, in accordance with aspects of the present invention, parameters such as magnetic fields at position 202 and sound at position 202 may be detected by a device of person in order to identify his location—as being in a vehicle. The mode of operation of the device may be set to vehicle mode.

In some embodiment, first a location of the device is identified. Then, if the location has a specific mode associated therewith, the mode of the device may be changed to correspond to the identified location. This will be described in more detail with respect to FIGS. 3-7.

Figure 3:
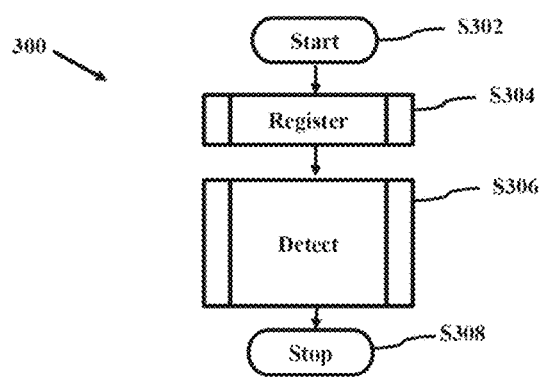
FIG. 3 illustrates an example method of determining a location in accordance with aspects of the present invention.

FIG. 3 illustrates an example method 300 of determining a location in accordance with aspects of the present invention.

Figure 4:
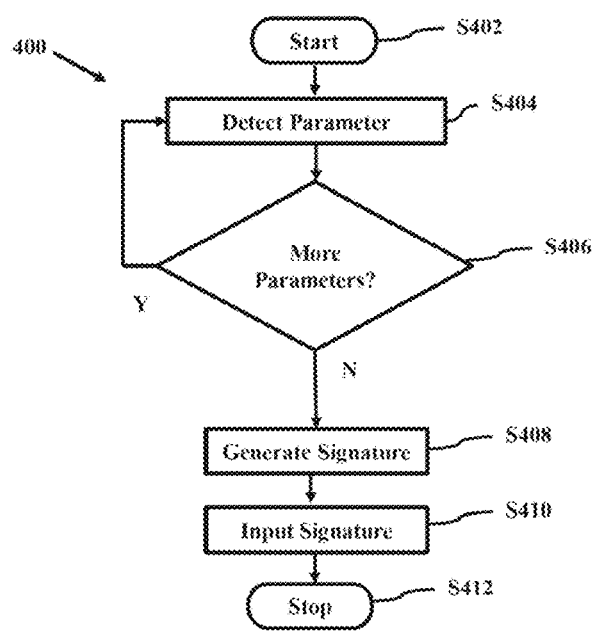
FIG. 4 illustrates an example method of registering a signature associated with a location in accordance with aspects of the present invention.

Method 300 starts (S302) and a location is registered (S304), FIG. 4 illustrates an example method 400 of registering a signature associated with a location in accordance with aspects of the present invention. For purposes of discussion, an example device will be described with additional reference to FIG. 5 to discuss method 400.

Figure 5:
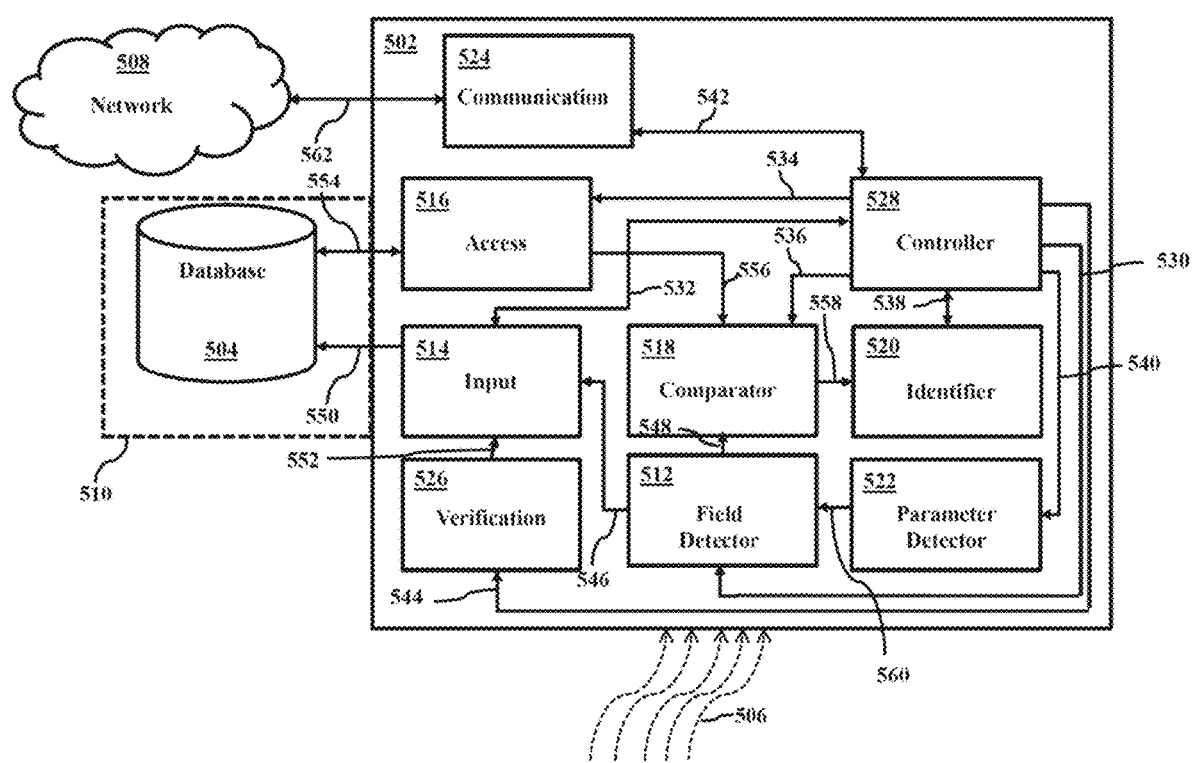
FIG. 5 illustrates an example device for identifying a location in accordance with aspects of the present invention.

FIG. 5 illustrates an example device 502 in accordance with aspects of the present invention.

FIG. 5 includes a device 502, a database 504, a field 506 and a network 508. In this example embodiment, device 502 and database 504 are distinct elements. However, in some embodiments, device 502 and database 504 may be a unitary device as indicated by dotted line 510.

Device 502 includes a field-detecting component 512, an input component 514, an accessing component 516, a comparing component 518, an identifying component 520, a parameter-detecting component 522, a communication component 524, a verification component 526 and a controlling component 528.

In this example, field-detecting component 512, input component 514, accessing component 516, comparing component 518, identifying component 520, parameter-detecting component 522, communication component 524, verification component 526 and controlling component 528 are illustrated as individual devices. However, in some embodiments, at least two of field-detecting component 512, input component 514, accessing component 516, comparing component 518, identifying component 520, parameter-detecting component 522, communication component 524, verification component 526 and controlling component 528 may be combined as a unitary device. Further, in some embodiments, at least one of field-detecting component 512, input component 514, accessing component 516, comparing component 518, identifying component 520, parameter-detecting component 522, communication component 524, verification component 526 and controlling component 528 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 528 is configured to communicate with: field-detecting component 512 via a communication line 530; input component 514 via a communication line 532; accessing component 516 via a communication line 534; comparing component 518 via a communication line 536; identifying component 520 via a communication line 538; parameter-detecting component 522 via a communication line 540; communication component 524 via a communication line 542; and verification component 526 via a communication line 544. Controlling component 528 is operable to control each of field-detecting component 512, input component 514, accessing component 516, comparing component 518, identifying component 520, parameter-detecting component 522, communication component 524 and verification component 526.

Field-detecting component 512 is additionally configured to detect field 506, to communicate with input component 514 via a communication line 546 and to communicate with comparing component 518 via a communication line 548. Field-detecting component 512 may be any known device or system that is operable to detect a field, non-limiting examples of which include an electric field, a magnetic field, and electro-magnetic field and combinations thereof. In some non-limiting example embodiments, field-detecting component 512 may detect an amplitude of a field at an instant of time. In some non-limiting example embodiments, field-detecting component 512 may detect a field vector at an instant of time. In some non-limiting example embodiments, field-detecting component 512 may detect an amplitude of a field as a function over a period of time. In some non-limiting example embodiments, field-detecting component 512 may detect a field vector as a function over a period of time. In some non-limiting example embodiments, field-detecting component 512 may detect a change in the amplitude of a field as a function over a period of time. In some non-limiting example embodiments, field-detecting component 512 may detect a change in a field vector as a function over a period of time. Field-detecting component 512 is additionally able to generate a field signal based on the detected field.

Input component 514 is additionally configured to communicate with database 504 via a communication line 550 and to communicate with verification component 526 via a communication line 552. Input component 514 may be any known device or system that is operable to input data into database 504. Non-limiting examples of input component 514 include a graphic user interface having a user interactive touch screen or keypad.

Accessing component 516 is additionally configured to communicate with database 504 via a communication line 554 and to communicate with comparing component 518 via a communication line 556. Accessing component 516 may be any known device or system that access data from database 504.

Comparing component 518 is additionally configured to communicate with identifying component 520 via a communication line 558. Comparing component 518 may be any known device or system that is operable to compare two inputs.

Parameter-detecting component 522 is additionally configured to communicate with field-detecting component 512 via a communication line 560. Parameter-detecting component 522 may be any known device or system that is operable to detect a parameter, non-limiting examples of which include velocity, acceleration, geodetic position, sound, temperature, vibrations, pressure, contents of surrounding atmosphere and combinations thereof. In some non-limiting example embodiments, parameter-detecting component 522 may detect an amplitude of a parameter at an instant of time. In some non-limiting example embodiments, parameter-detecting component 522 may detect a parameter vector at an instant of time. In some non-limiting example embodiments, parameter-detecting component 522 may detect an amplitude of a parameter as a function over a period of time. In some non-limiting example embodiments, parameter-detecting component 522 may detect a parameter vector as a function over a period of time. In some non-limiting example embodiments, parameter-detecting component 522 may detect a change in the amplitude of a parameter as a function over a period of time. In some non-limiting example embodiments, parameter-detecting component 522 may detect a change in a parameter vector as a function over a period of time.

Communication component 524 is additionally configured to communicate with network 508 via a communication line 562. Communication component 524 may be any known device or system that is operable to communicate with network 508. Non-limiting examples of communication component include a wired and a wireless transmitter/receiver.

Verification component 526 may be any known device or system that is operable to provide a request for verification. Non-limiting examples of verification component 526 include a graphic user interface having a user interactive touch screen or keypad.

Communication lines 530, 532, 534, 536, 538, 540, 542, 544, 544, 546, 548, 550, 552, 554, 556, 558, 560 and 562 may be any known wired or wireless communication path or media by which one component may communicate with another component.

Database 504 may be any known device or system that is operable to receive, store, organize and provide (upon a request) data, wherein the "database" refers to the data itself and supporting data structures. Non-limiting examples of database 504 include a memory hard-drive and a semiconductor memory.

Network 508 may be any known linkage of two or more communication devices. Non-limiting examples of database 508 include a wide-area network, a local-area network and the Internet.

Returning to FIG. 4, method 400 starts (S402) and a parameter is detected (S404). For example, returning to FIG.

5, let the parameter be a field, wherein field-detecting component 512 detects field 506. For purposes of discussion, let field 506 be a magnetic field corresponding to the magnetic fields generated by all electronic and mechanical systems involved with the vehicle while the device is near location 116, as discussed above with reference to FIG. 1. This is a non-limiting example, wherein the detected parameter may be any known detectable parameter, of which other non-limiting examples include electric fields, electro-magnetic fields, velocity, acceleration, angular velocity, angular acceleration, geodetic position, sound, temperature, vibrations, pressure, biometrics, contents of surrounding atmosphere, a change in electric fields, a change in electro-magnetic fields, a change in velocity, a change in acceleration, a change in angular velocity, a change in angular acceleration, a change in geodetic position, a change in sound, a change in temperature, a change in vibrations, a change in pressure, a change in biometrics, a change in contents of surrounding atmosphere and combinations thereof.

Returning to FIG. 4, after the first parameter is detected (S404), it is determined whether another parameter is to be detected (S406). For example, returning to FIG. 5, controlling component 528 may instruct at least one of field-detecting component 512 and parameter-detecting component 522 to detect another parameter.

A magnetic field may be a relatively distinct parameter that may be used to determine whether device 502 is in a specific location. However, there may be situations that elicit a false positive—e.g., a magnetic field that erroneously indicates that device 502 is in a vehicle is actually associated with the operation of a vending machine that is not in the vehicle. As such, in order to reduce the probability of a false positive indication that device 502 is in a specific location, a second parameter associated with the location may be used. Along this notion, it is an example aspect of the invention to detect a plurality of parameters associated with a location to increase the probability of a correct identification of the location.

In some embodiments, device 502 has a predetermined number of parameters to detect, wherein controlling component 528 may control such detections. For example, the first parameter to be detected (in S404) may be a magnetic field associated with a running vehicle, wherein controlling component 528 may instruct field-detecting component 512 to detect a magnetic field. Further, a second parameter to be detected may be another known detected parameter additionally associated with the running vehicle, e.g., sound, wherein controlling component 528 may instruct parameter-detecting component 522 to detect the second parameter. Further parameter-detecting component 522 may be able to detect many parameters. This will be described with greater detail with reference to FIG. 6.

Figure 6:
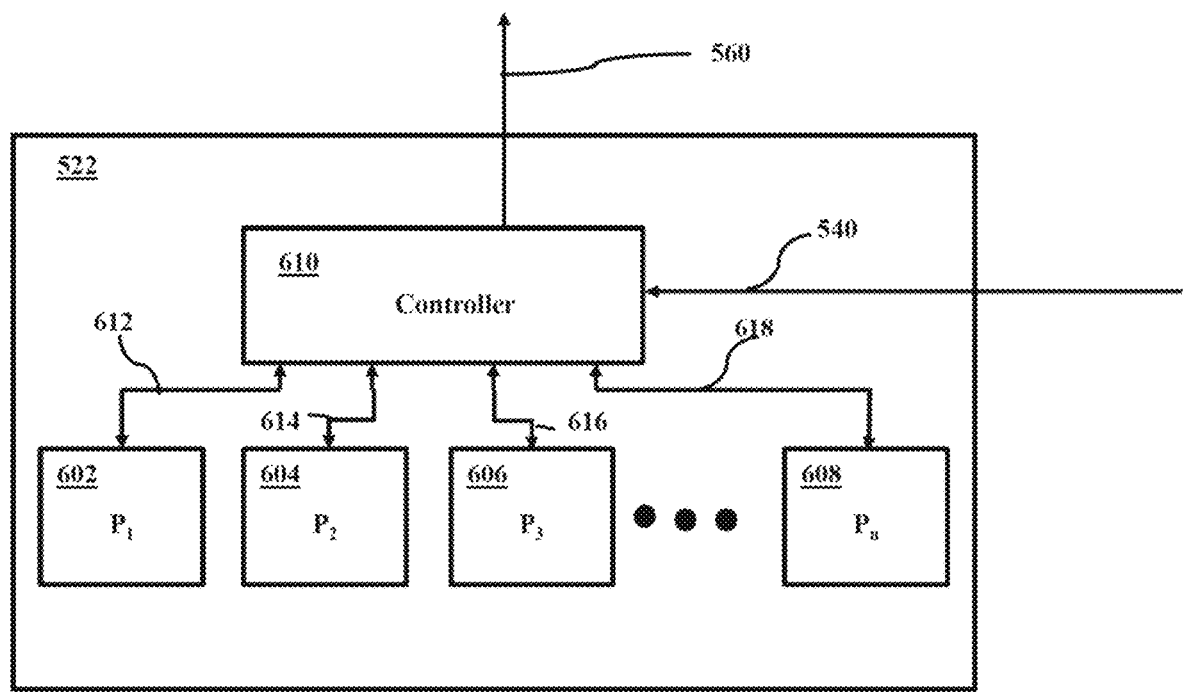
FIG. 6 illustrates an example parameter-detecting component in accordance with aspects of the present invention.

FIG. 6 illustrates an example parameter-detecting component 522.

As shown in the figure, parameter-detecting component 522 includes a plurality of detecting components, a sample of which are indicated as a first detecting component 602, a second detecting component 604, a third detecting component 606 and an n-th detecting component 608. Parameter-detecting component 522 additionally includes a controlling component 610.

In this example, detecting component 602, detecting component 604, detecting component 606, detecting component 608 and controlling component 610 are illustrated as individual devices. However, in some embodiments, at least two of detecting component 602, detecting component 604, detecting component 606, detecting component 608 and controlling component 610 may be combined as a unitary device. Further, in some embodiments, at least one of detecting component 602, detecting component 604, detecting component 606, detecting component 608 and controlling component 610 may be implemented as a computer having tangible computer-readable media for carrying or having computer-executable instructions or data structures stored thereon.

Controlling component 610 is configured to communicate with: detecting component 602 via a communication line 612; detecting component 604 via a communication line 614; detecting component 606 via a communication line 616; and detecting component 608 via a communication line 618. Controlling component 610 is operable to control each of detecting component 602, detecting component 604, detecting component 606 and detecting component 608. Controlling component 610 is additionally configured to communicate with controlling component 528 of FIG. 5 via communication line 540 and to communicate with field-detecting component 512 of FIG. 5 via communication line 560.

The detecting components may each be a known detecting component that is able to detect a known parameter. For example each detecting component may be a known type of detector that is able to detect at least one of electric fields, electro-magnetic fields, velocity, acceleration, angular velocity, angular acceleration, geodetic position, sound, temperature, vibrations, pressure, biometrics, contents of surrounding atmosphere, a change in electric fields, a change in electro-magnetic fields, a change in velocity, a change in acceleration, a change in angular velocity, a change in angular acceleration, a change in geodetic position, a change in sound, a change in temperature, a change in vibrations, a change in pressure, a change in biometrics, a change in contents of surrounding atmosphere and combinations thereof. For purposes of discussion, let: detecting component 602 be able to detect sound; detecting component 604 be able to detect velocity in three dimensions; detecting component 606 be able to detect vibrations; and detecting component 608 be able to detect geodetic position.

In some non-limiting example embodiments, at least one of the detecting components of parameter-detecting component 522 may detect a respective parameter as an amplitude at an instant of time. In some non-limiting example embodiments, at least one of the detecting components of parameter-detecting component 522 may detect a respective parameter as a function over a period of time.

Each of the detecting components of parameter-detecting component 522 is able to generate a respective detected signal based on the detected parameter. Each of these detected signals may be provided to controlling component 610 via a respective communication line.

Controlling component 610 is able to be controlled by controlling component 528 via communication line 540.

Returning to FIG. 4, if another parameter is to be detected (Y at S406), then another parameter will be detected (S404). For example, as shown in FIG. 5, controlling component 528 may then instruct parameter-detecting component 522 to detect another parameter via communication line 540. For purposes of discussion, let the second parameter to be detected be sound. As such, at this point, as shown in FIG. 6, controlling component 610 instructs detecting component 602, via communication line 612, to detect sound. Detecting component 602 provides a signal corresponding to the detected sound to controlling component 610 via communication line 612. In this example, controlling component

610 may then provide the detected signal to field-detecting component 512 via communication line 560 as shown in FIG. 5.

Returning to FIG. 4, if another parameter is to be detected (Y at S406), then another parameter will be detected (S404). For example, as shown in FIG. 5, controlling component 528 may then instruct parameter-detecting component 522 to detect another parameter via communication line 540. For purposes of discussion, let the second parameter to be detected be velocity in three dimensions. As such, at this point, as shown in FIG. 6, controlling component 610 instructs detecting component 604, via communication line 614, to detect velocity in three dimensions. Detecting component 604 provides a signal corresponding to the detected three dimensional velocity to controlling component 610 via communication line 614. In this example, controlling component 610 may then provide the detected signal to field-detecting component 512 via communication line 560 as shown in FIG. 5.

Returning to FIG. 4, if another parameter is to be detected (Y at S406), then another parameter will be detected (S404). This process will repeat until all the parameters to be detected are detected. In some embodiments, this process will repeat a predetermined number of times in order to detect predetermined types of parameters. In some embodiments, this process is only repeated until enough parameters are detected in order reach a predetermined probability threshold, which will reduce the probability of a false positive location identification.

Retuning to FIG. 6, as just discussed, controlling component 610 is able to send individual detected signals from each detecting component. In other example embodiments, controlling component 610 is able to receive and hold the individual detected signals from each detecting component, wherein controlling component 610 is able to generate a composite detected signal that is based on the individual detected signals. The composite detected signal may be based on any of the individual detected signal, and combinations thereof. In some embodiments, controlling component 610 may additionally process any of the individual detected signals and combinations thereof to generate the composite detected signal. Non-limiting examples of further processes include averaging, adding, subtracting, and transforming any of the individual detected signals and combinations thereof.

It should be further noted that in some embodiments, all parameters that are to be detected are detected simultaneously. In such a case, for example, as shown in FIG. 5, controlling component 528 may then instruct parameter-detecting component 522 to detect all parameters via communication line 540. As such, at this point, as shown in FIG. 6, controlling component 610 instructs all the detecting components to detect their respective parameters. All the detecting components then provide a respective signal corresponding to the respective detected parameter to controlling component 610 via communication line 614. In this example, controlling component 610 may then provide the detected signal to field-detecting component 512 via communication line 560 as shown in FIG. 5.

Returning to FIG. 4, if no more parameters are to be detected (N at S406), then a signature is generated (S408). In some embodiments, for example as shown in FIG. 5, field-detecting component 512 may generate a signature of the location based on the field signal and the detected signal from parameter-detecting component 522. In some embodiments, field-detecting component 512 may additionally process any of the field signal and the detected signal from parameter-detecting component 522 to generate such a signature. Non-limiting examples of further processes include averaging, adding, subtracting, and transforming any of the field signal and the detected signal from parameter-detecting component 522. Therefore, the generated signature is based on the detected field and at least one detected parameter.

Returning to FIG. 4, once the signature is generated (S408), the signature in input into memory (S410). For example, as shown in FIG. 5, field-detecting component 512 provides the signature to input component 514 via communication line 546.

In an example embodiment, input component 514 includes a GUI that informs a user of device 502 that a signature has been generated. Input component 514 may additionally enable the user to input an association between the location and the generated signature. For example, input component 514 may display on a GUI a message such as "A signature was generated. To what location is the signature associated?" Input component 514 may then display an input prompt for the user to input, via the GUI, a location to be associated with the generated signature.

Input component 514 may then provide the signature, and the association to a specific location, to database 504 via communication line 550.

As discussed above, in some embodiments, database 504 is part of device 502, whereas in other embodiments, database 504 is separate from device 502. Data input and retrieval from database 504 may be faster when database 504 part of device 502, as opposed to cases where database 504 is distinct from device 502. However, size may be a concern when designing device 502, particularly when device 502 is intended to be a handheld device such as a smartphone. As such, device 502 may be much smaller when database 504 is distinct from device 502, as opposed to cases where database 504 is part of device 502.

Consider an example embodiment, where database 504 is part of device 502. In such cases, input component 514 may enable a user to input signatures and the location associations, for a predetermined number of locations. In this manner, database 504 will only be used for device 502.

Now consider an example embodiment, where database 504 is separate from device 502. Further, let database 504 be much larger than the case where database 504 is part of device 502. Still further, let database 504 be accessible to other devices in accordance with aspects of the present invention. In such cases, input component 514 may enable a user to input signatures and the item/location associations, for a much larger predetermined number of locations. Further, in such cases, input component 514 may enable other users of similar devices to input signatures and the location associations, for even more locations.

An example embodiment may use the differentiating magnetic field properties and other detected parameters associated with a vehicle to identify the vehicle. Today's vehicles are fully equipped with electronic and mechanical actuators and switches, engine subsystems. All these subsystems are generating their own electromagnetic and magnetic fields and therefore will alter the overall three-dimensional properties and field strength fluctuations of the vehicle interior, for example as discussed above with reference to lines 206 of FIG. 2. Further, particularly the ignition of a vehicle generates a characteristic magnetic flux for every vehicle. Additionally, many vehicles generate an identifying amount of road noise in the vehicle interior, for example as discussed above with reference to lines 208 of FIG. 2. Aspects of the present invention include generating a signature based on at least two of these detected parameters and storing these signatures within database 504 for a reference group of make and models. As such, any user of a device may be able to identify a registered vehicle within database 504. Thus, through previously stored signatures and additional measurements, the present invention enables a library of vehicular signatures. This library may be augmented with additional measurements describing the signatures of different vehicles.

It should be noted that although the above-discussed example includes identifying a vehicle as a location, this is a non-limiting example. Aspects of the invention may additionally be used to identify any location that has detectable parameters.

At this point, method 400 stops (S412).

Returning to FIG. 3, now that a location is registered (S304), a new location may be detected (S306). An example method of detecting a new location will now be described with reference to FIG. 7.

Figure 7:
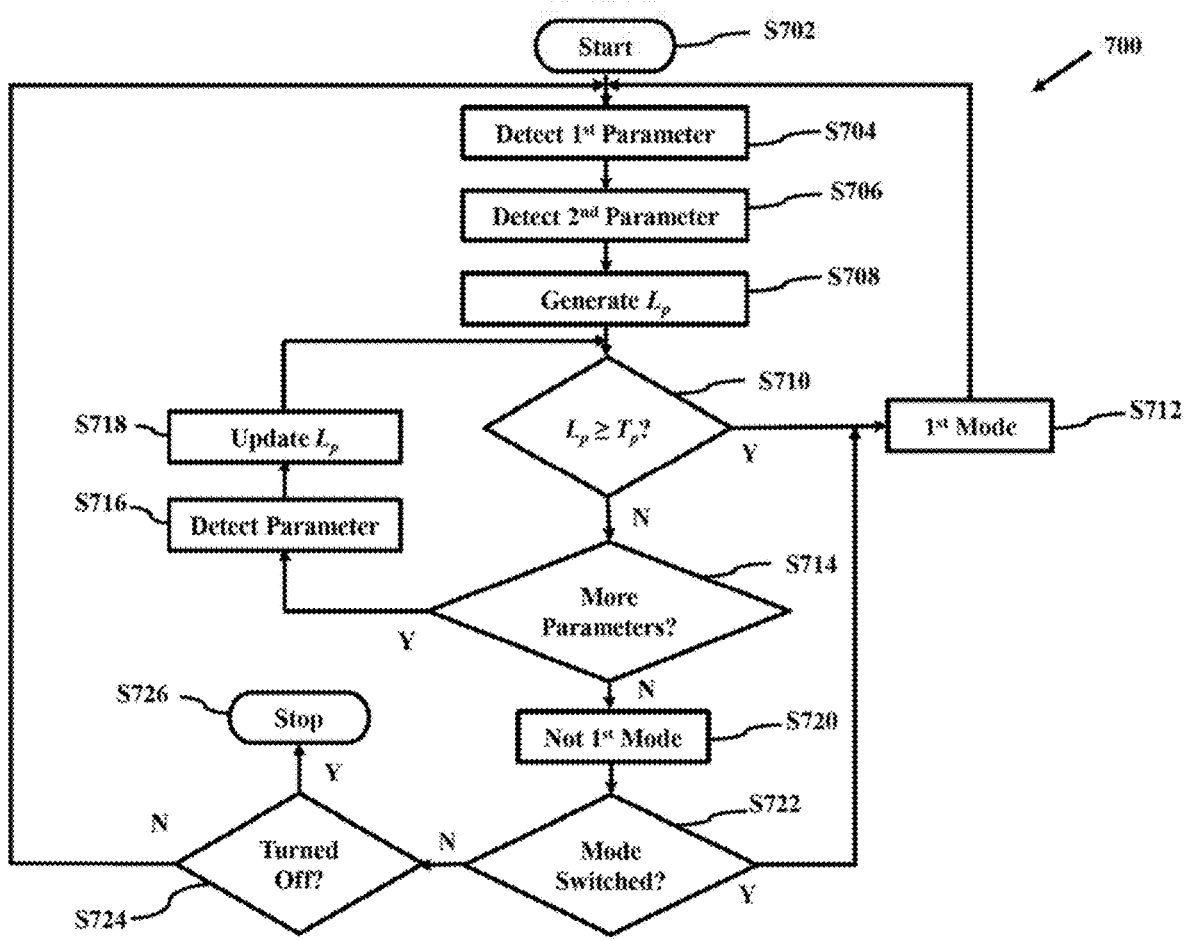
FIG. 7 illustrates an example method of detecting a location in accordance with aspects of the present invention.

FIG. 7 illustrates an example method 700 of detecting a location in accordance with aspects of the present invention. For purposes of discussion, let the location to be identified be a vehicle.

Method 700 starts (S702) and the first parameter is detected (S704). This is similar to the parameter detecting (S404) of method 400 discussed above with reference to FIG. 4. For example, returning to FIG. 5, let the parameter be a field, wherein field-detecting component 512 detects field 506. For purposes of discussion, let field 506 be a magnetic field corresponding to the superposition of magnetic fields generated by all electronic and mechanical systems involved with the vehicle while the device is near location 116, as discussed above with reference to FIG. 1. Again, this is a non-limiting example, wherein the detected parameter may be any known detectable parameter, of which other non-limiting examples include electric fields, electromagnetic fields, velocity, acceleration, angular velocity, angular acceleration, geodetic position, sound, temperature, vibrations, pressure, biometrics, contents of surrounding atmosphere, a change in electric fields, a change in electromagnetic fields, a change in velocity, a change in acceleration, a change in angular velocity, a change in angular acceleration, a change in geodetic position, a change in sound, a change in temperature, a change in vibrations, a change in pressure, a change in biometrics, a change in contents of surrounding atmosphere and combinations thereof.

Returning to FIG. 7, after the first parameter is detected (S704), a second parameter is detected (S706). For example, returning to FIG. 5, controlling component 528 may instruct at least one of field-detecting component 512 and parameter-detecting component 522 to detect another parameter. This is similar to method 400 (S406) discussed above with reference to FIG. 4.

Returning to FIG. 7, after the first two parameters are detected (S704 and S706), a location probability, $L_p$, is generated (S708). For example, first a signature may be generated based on the two detected parameters. This signature may be generated in a manner similar to the manner discussed above in method 400 (S408) of FIG. 4. Controlling component 528 may then instruct access component 516 to retrieve the previously-stored signature, e.g., from method 400 of FIG. 4, from database 504 and to provide the previously-stored signature to comparing component 518.

Controlling component 528 may then instruct comparator to generate a location probability, $L_p$, indicating a probability that the new location as the previous location. In an example embodiment, the newly generated signature is compared with the previously-stored signature. If the newly generated signature is exactly the same as the previously-stored signature, then the generated location probability will be 1, thus indicating that the newly-detected location is the same as the previously-detected location. Variations between the newly generated signature and the previously-stored signature will decrease the generated location probability, thus decreasing the likelihood that the newly-detected location is the same as the previously-detected location. Any known method of comparing two signatures to generate such a probability may be used.

In an example embodiment, a comparison is made between similar parameter signals. For example, let a previously-stored signature be a function corresponding to a previously-detected magnetic field and a second function corresponding to a previously-detected sound, and let a newly-detected signature be a function corresponding to a newly-detected magnetic field and a second function corresponding to a newly-detected sound. The comparison would include a comparison of the function corresponding to the previously-detected magnetic field and the function corresponding to the newly-detected magnetic field and a comparison of the second function corresponding to a previously-detected sound and the second function corresponding to a newly-detected sound.

Controlling component 528 may then provide the location probability to identifying component 520 via communication line 558.

Returning to FIG. 7, it is then determined whether the generated location probability is greater than or equal to a predetermined probability threshold (S710). For example, identifying component 520 may have a predetermined probability threshold, $T_p$, stored therein. The probability threshold $T_p$ may be established to take into account acceptable variations in detected parameters. For example, all vehicles may have varying unique magnetic signatures, thermal signatures, and acoustic signatures. However, when compared to the magnetic signatures, thermal signatures, and acoustic signatures of a public library, the magnetic signatures, thermal signatures, and acoustic signatures of all vehicles may be considered somewhat similar. These similarities may be taken into account when setting the probability threshold Tp.

Clearly, if the probability threshold $T_p$ is set to one, this would only be met if newly generated signature is exactly the same as the previously-stored signature, thus indicating that the newly-detected location is the same as the previously-detected location. Further, this threshold would not be met if the sensors did not detect the exact parameters, which does not generally represent a real world scenario. On the contrary, if the probability threshold $T_p$ is decreased, it would take into account variations in the detected parameters. Further, if the probability threshold $T_p$ is decreased further, it may take into account variations in a class of locations, e.g., all vehicles.

In an example embodiment, identifying component 520 determines whether the location probability $L_p$ generated by comparing component 518 is greater than or equal to the predetermined probability threshold $T_p$. In this case, identifying component 520 is a probability-assessing component that generates a probability of a specific mode based on a comparison or comparison signal.

Returning to FIG. 7, if it is determined that the generated location probability is greater than or equal to the predetermined probability threshold (Y at S710), then the device is operated in a first mode (S712). For example, consider the situation where a person carrying device 502 is driving in vehicle 102, that the signature for vehicle 102 has been previously stored, and that identifying component 520 has determined that the newly detected signature matches the previously stored signature for vehicle 102. In such a case, identifying component 520 instructs controlling component 528, via communication line 538, that device 502 should operate in a specific mode. For purposes of discussion, in this example, let the specific mode be a first mode, wherein the first mode is a vehicle mode. Further, for purposes of discussion, let the vehicle mode be such a mode wherein predetermined functions of device 502 may be disabled, such as texting.

It should be noted that aspects of the present invention may be used to establish operation of any type of mode of a device, wherein a specific mode may be associated with a specific location, and wherein the functionality of the device is altered in accordance with aspects of the specific location. For example, a "library mode" may alter the function of device 502 such that it is silent and only has a vibration alert.

Returning to FIG. 7, once the device is operated in the first mode (S712), the process repeats and the first parameter is again detected (S704).

If it is determined that the generated location probability is less than the predetermined probability threshold (N at S710), it is determine whether an additional parameter is to be detected (S714). For example, returning to FIG. 6, as discussed previously, parameter-detecting component 522 may be able to detect a plurality of parameters. In some embodiments, all parameters are detected at once, whereas in other embodiments some parameters are detected at different times.

Consider the situation where an initially generated location probability is based only on a newly-detected magnetic field as detected by field-detecting component 512 and on a newly-detected sound as detected by detecting component 602. Further, for purposes of discussion, let the generated location probability be less than the predetermined probability threshold. In such a case, if more parameters had been detected, they may be used to further identify the new location.

Returning to FIG. 7, if an additional parameter is to be detected (Y at S714), then an additional parameters is detected (S716). For example, controlling component 528 may instruct parameter-detecting component 522 to provide additional information based on additionally detected parameters to field-detecting component 512.

Returning to FIG. 7, after the additional parameter is detected (S716), the location probability is updated (S718). For example, the new signature may be generated in a manner similar to the manner discussed above in method 400 (S408) of FIG. 4. Controlling component 528 may then instruct access component 516 to retrieve the previously-stored signature, e.g., from method 400 of FIG. 4, from database 504 and to provide the previously-stored signature to comparing component 518.

Controlling component 528 may then instruct comparator to generate an updated location probability, $L_{pu}$, indicating a probability that the new location as the previous location. In an example embodiment, the newly generated signature is compared with the previously-stored signature. Again, any known method of comparing two signatures to generate such a probability may be used.

In an example embodiment, a comparison is made between similar parameter signals. For purposes of discussion, let the previously generated location probability $L_p$ be based on the newly-detected magnetic field as detected by field-detecting component 512 and on a newly-detected sound as detected by detecting component 602. Now, let the updated, generated location probability $L_{pu}$ be based on: 1) the newly-detected magnetic field as detected by field-detecting component 512; 2) the newly-detected sound as detected by detecting component 602; 3) a newly-detected velocity in three dimensions as detected by detecting component 604; 4) newly-detected vibrations as detected by detecting component 606; and 5) a newly-detected change in geodetic position as detected by detecting component 608.

The comparison would include a comparison of the function corresponding to the previously-detected magnetic field and the function corresponding to the newly-detected magnetic field and a comparison of the second function corresponding to a previously-detected sound and the second function corresponding to a newly-detected sound.

Returning to FIG. 7, after the location probability is updated (S718), it is again determined whether the generated location probability is greater than or equal to a predetermined probability threshold (S710). Continuing the example discussed above, now that many more parameters have been considered in the comparison, the updated location probability $L_p$, which is now $L_{pu}$, is greater than or equal to the probability threshold $T_p$. For example, although the previous comparison between only two parameters provided a relatively low probability, the additional parameters greatly increased the probability. For example, consider the situation where the detected magnetic field and the detected sound are sufficiently dissimilar to the previously stored magnetic field and sound associated with a previously stored location, e.g., a specific running vehicle. However, now that more parameters are considered, e.g., velocity, vibrations and change in geodetic position, it may be more likely that the current location is in fact the same as the previously stored location, e.g., a running vehicle.

Returning to FIG. 7, if an additional parameter is not to be detected (N at S714), then the device is not operated in the first mode (S716). For purposes of discussion, let the previously determined location be a vehicle and let device 502 be able to operate in a vehicle mode when in a vehicle. If the location probability Lp is ultimately lower than the predetermined probability threshold Tp, then the current location is determined to not be the same as the previously determined location. As such, device 502 would not be operating in the mode associated with the previously determined location. In this example therefore, device 502 would not be operating in a vehicle mode.

Returning to FIG. 7, it is then determined whether the current operating mode has been switched to the first mode (S722). For example, returning to FIG. 5, there may be situations where a user would like device 502 to operate in a specific mode, even though device 502 is not currently operating in such a mode. In those situations, user 502 may be able to manually change the operating mode of device 502. For example, the GUI of input component 514 may enable the user to instruct controlling component 528, via communication line 532, to operate in a specific mode.

Returning to FIG. 7, if it is determined that the current operating mode has been switched to the first mode (Y at S722), then the device is operated in a first mode (S712).

Alternatively, if it is determined that the mode has not been switched (N at S722), then it is determined whether the device has been turned off (S724). For example, returning to FIG. 5, there may be situations where a user turns off device 502 or device 502 runs out of power. If it is determined that the device has not been turned off (N at S724), the process repeats and the first parameter is again detected (S704).

Alternatively, if it is determined that the device has been turned off (Y at S724), the method 700 stops (S726).

At this point, method 300 stops (S310).

The example embodiments discussed above are drawn to identifying a location using fields associated therewith. Once identified, other functions may be available. For example, consider the situation wherein a device in accordance with aspects of the present invention is embodied in a smartphone. In such an example, once a location (e.g., a vehicle, a house, an office building, etc.) is identified, the smartphone may institute a suite of applications and turn off other applications. In a specific example embodiment, the identification of a vehicle may be used to place a smartphone in a "Vehicle Mode," wherein the smartphone will operate in a particular manner because it is determined to be in a vehicle.

In accordance with aspects of the present invention discussed above, the sensors and functionalities of smartphones can be used to supplement or even replace the known vehicle-based techniques of vehicle telematics. More specifically, smartphone-to-smartphone (when both phones are in Vehicle Mode), smartphone-to-infrastructure and infrastructure-to-smartphone communications (again, when the smartphone is in Vehicle Mode) can provide drivers with a wide range of telematics services and features, while resulting in little or no additional cost to the vehicle driver (because she likely already has a smartphone) or the vehicle manufacturer (because it doesn't have to provide the purchaser of the vehicle with a smartphone and also doesn't have to embed costly vehicle telematics equipment in the vehicle). To be able to do so, however, the smartphone again has to be able to "know" that it is in Vehicle Mode and be able to determine in what vehicle it is. Ideally for various applications it is necessary to be able to determine if the smartphone is in the vehicle that is owned by the smartphone user. Aspects of the present invention enable a smartphone to know that it is in Vehicle Mode based on detected magnetic, electric, magneto-electric fields and combinations thereof.

Further in accordance with the present invention, a smartphone may utilize its magnetometer function to periodically measure the electromagnetic levels sensed at the smartphone's current location. The smartphone uses its processing capabilities to try to map the periodic electromagnetic levels sensed by the smartphone with the vehicular electromagnetic signatures stored in library. If the periodic electromagnetic levels sensed by the smartphone match any of the specific vehicle signatures stored in the library, then the processor of the smartphone may generate and/or otherwise output a signal indicating that the smartphone is located in the specific vehicle, which in turn will be used by the Vehicle Mode detection method to trigger certain functions.

The Vehicle Mode relevant sensor suite may be monitored at intervals depending on detected speed and location, for example, up to several times per second. The magneto metric sensor output may be monitored dependent on the accelerometer output as this will indicate a movement of the phone either within the vehicle environment or of the vehicle itself.

The above discussed example embodiments envision automatically detecting an in-vehicle mode of operation of a communication device. In other example embodiments, an in-vehicle mode is detected by: first detecting whether the person who is carrying the communication device is entering a vehicle; then detecting a triggering in-vehicle mode parameter over a predetermined period of time; then determining whether the velocity of the communication device is above a predetermined velocity threshold. Examples of such embodiments will now be described in greater detail with reference to FIGS. 8-11.

Figure 8:
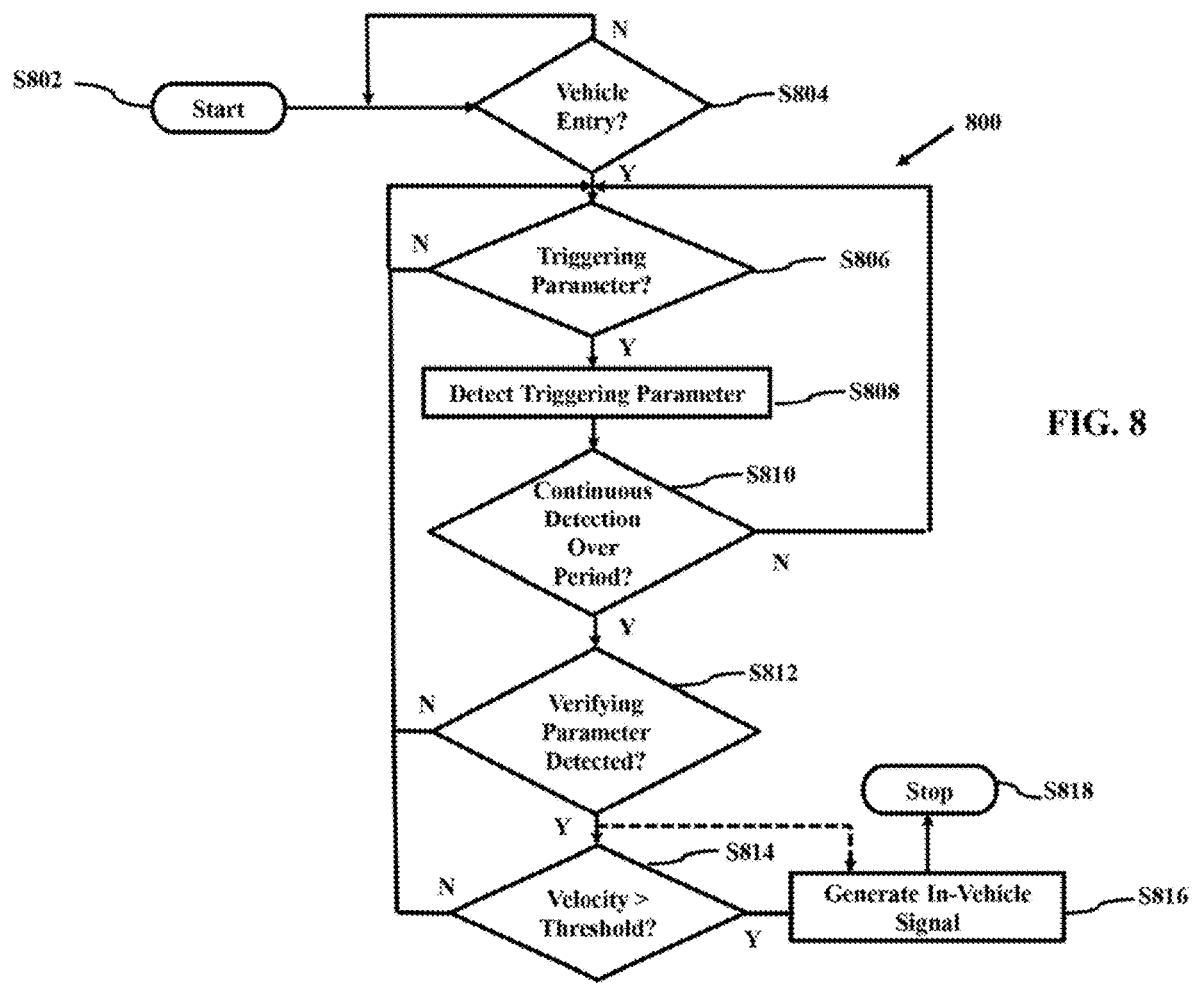
FIG. 8 illustrates an example method of automatically detecting in-vehicle mode of operation of a communication device in accordance with aspects of the present invention.

FIG. 8 illustrates an example method 800 of automatically detecting in-vehicle mode of operation of a communication device in accordance with aspects of the present invention.

As shown in the figure, method 800 starts (S802) and it is determined whether a person is entering a vehicle (S804). Any known system or method of determining whether a person is entering a vehicle may be used. In a non-limiting example embodiment, acceleration and angular acceleration are monitored to recognize motion associated with a person entering a vehicle. This will be described with additional reference to FIGS. 9A-B.

Figure 9A:
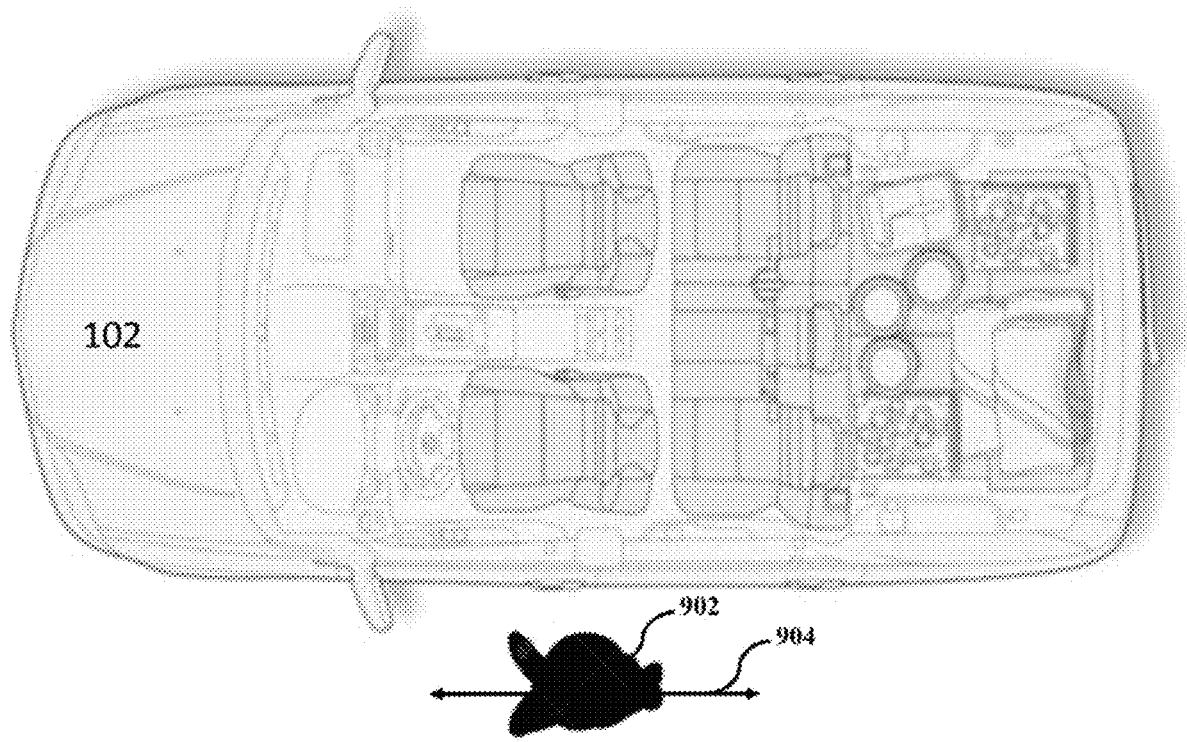
FIGS. 9A-B illustrate a person entering vehicle.
Figure 9B:
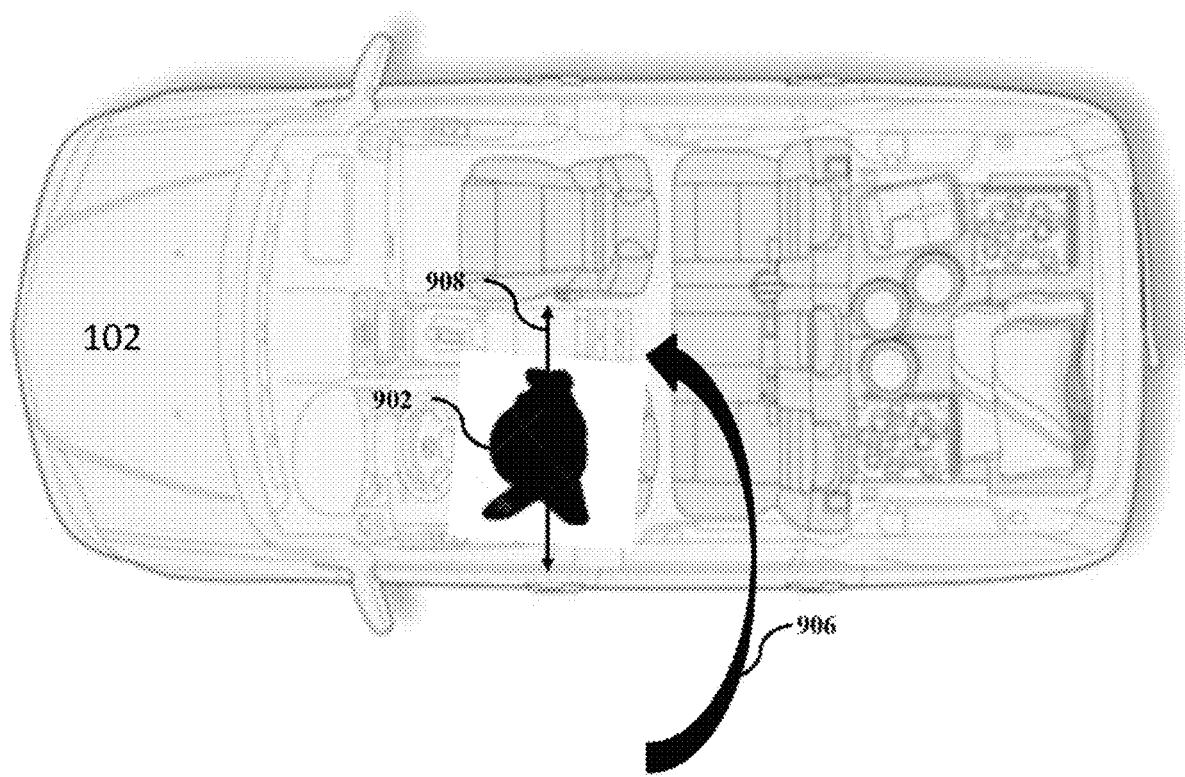

FIGS. 9A-B illustrate a person 902 entering vehicle 102. FIG. 9A illustrates person 902 outside of vehicle 102, whereas FIG. 9B illustrates person 902 subsequently sitting inside of vehicle 102.

As shown in FIG. 9A, person 902 is positioned such that the shoulders are aligned along a direction indicated by double arrow 904, which is parallel with the side of vehicle 102. As shown in FIG. 9B, person 902 is positioned such that the shoulders are aligned along a direction indicated by double arrow 908, which is perpendicular with the side of vehicle 102. Detection of acceleration and angular acceleration will be described with additional reference to FIG. 5.

Consider the situation where person 902 is carrying communication device 502 in his hand, pants pocket, shirt pocket, jacket pocket, etc. When person 902 transitions from the position and orientation as shown in FIG. 9A to the position and orientation as shown in FIG. 9B, the person will pivot in a counter clockwise direction as shown by curved arrow 906 in FIG. 9B. Communication device 502 will undergo acceleration and angular acceleration consistent with this movement.

In this example embodiment, let one of the detecting components in parameter detecting component 522, as shown in FIG. 6, be operable to detect acceleration in three linear directions and let another of the detecting components be operable to detect angular acceleration. A signature associated with vehicle entry motion may then be generated based on the two detected parameters. This signature may be generated in a manner similar to the manner discussed above in method 400 (S408) of FIG. 4.

Controlling component 528 may then instruct access component 516 to retrieve a previously-stored signature that is associated with a person's motion as entering a vehicle from database 504. Controlling component 528 may then provide the previously-stored signature to comparing component 518.

Controlling component 528 may then instruct comparator to compare the newly generated signature with the previously-stored signature. If the newly generated signature is similar to the previously-stored signature, then the newly-detected motion is the same as the previously-detected motion associated with entering a vehicle.

Returning to FIG. 8, if it is determined that a person is not entering a vehicle (N at S804), method 800 continues to determine whether a person is entering a vehicle (return to S804). Alternatively, if it is determined that a person is entering a vehicle (Y at S804), then it is determined whether a triggering parameter associated with an in-vehicle mode of operation is detected (S806). For example, any known system or method of determining whether a triggering parameter associated with an in-vehicle mode of operation is detected may be used. In a non-limiting example embodiment, detection of a triggering parameter associated with an in-vehicle mode of operation may be performed as discussed in method 700 as described above with reference to FIG. 7 (e.g., S704-S714).

However, it should be noted that merely detecting parameters and generating signatures associated with an in-vehicle mode of operation, for example as discussed with reference to method 700, does not indicate operation in a car mode. On the contrary, in accordance with this aspect of the present invention, this initial parameter associated with an in-vehicle mode of operation is used to trigger a more extensive determination of an in-vehicle mode of operation. This aspect of the present invention prevents false positive identification of an in-vehicle mode or operation and saves power.

For example, consider a conventional system for detecting an in-vehicle mode of operation by detecting associated parameters, wherein a person is sitting on a chair while gently bouncing his leg up and down. Suppose that such movement is detected by the conventional communication device and generates a signature that is commensurate with an in-vehicle mode of operation. In other words, the smartphone incorrectly thinks the person is driving a vehicle.

To avoid such a situation, in accordance with aspects of the present invention, once triggered, a communication device determines whether such a parameter (or parameters) associated with an in-vehicle mode of operation are detected over a predetermined period.

Returning to FIG. 8, if a triggering parameter associated with an in-vehicle mode of operation is not detected (N at S806), method 800 continues to determine whether a triggering parameter associated with an in-vehicle mode of operation is detected (return to S806). Alternatively, if a triggering parameter associated with an in-vehicle mode of operation is detected (Y at S806), then the triggering parameter associated with an in-vehicle mode continues to be detected over a predetermined period (S808). For example, any known system or method of detecting the triggering parameter associated with an in-vehicle mode over a predetermined period of time may be used.

In a non-limiting example embodiment, as shown in FIG. 5, controlling component 528 may have a detection period threshold, $p_{th}$, stored therein. Controlling component 528 may start a timer at the time the triggering parameter is detected, $t_1$, wherein the timer may run for the period of detection period threshold $p_{th}$. The detection of a triggering parameter associated with an in-vehicle mode of operation may continue to be performed throughout the period of detection period threshold $p_{th}$. Controlling component 528 provides the detection period threshold, $p_{th}$, to comparing component 518. Comparing component 518 then compares the period that the triggering parameter is detected with the detection period threshold, $p_{th}$, and generates a compared signal. The compared signal is provided to identifying component 520.

If the triggering parameter is detected for a longer period than the detection period threshold, $p_{th}$, then comparing component 518 instructs identifier 520 to generate a triggering detector signal for further in-vehicle mode detection. The triggering detector signal is based on the triggering detected parameter over the predetermined period of time. If the triggering parameter is not detected for a longer period than the detection period threshold, $p_{th}$, then comparator 518 instructs identifier 520 not to generate a triggering detector signal for further in-vehicle mode detection.

Returning to FIG. 8, after the triggering parameter associated with an in-vehicle mode is monitored over a predetermined period (S808), it is determined whether the triggering parameter associated with an in-vehicle mode of operation is detected over the predetermined period (S810). This will be further described with reference to FIGS. 10-11.

Figure 10:
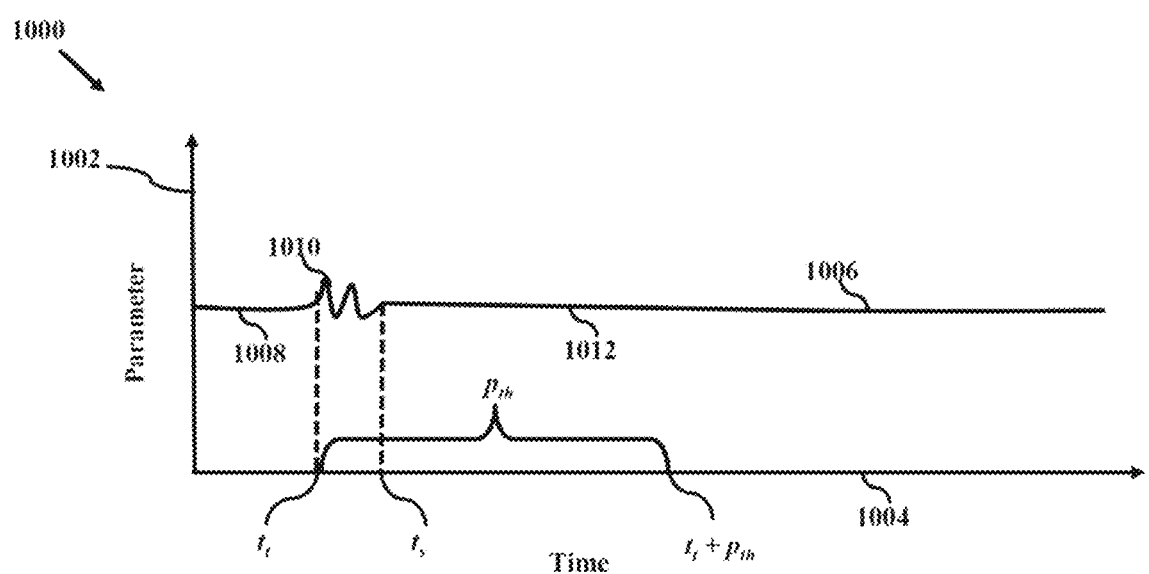
FIG. 10 illustrates a graph of a detected parameter magnitude as a function of time.

FIG. 10 illustrates a graph 1000 of a detected parameter magnitude as a function of time.

As shown in the figure, graph 1000 includes a y-axis 1002 of parameter magnitude, an x-axis 1004 of time and a function 1006. Function 1006 includes a substantially constant portion 1008, a portion 1010 and a substantially constant portion 1006.

For purposes of discussion, let function 1006 correspond to a magnitude of acceleration as detected by parameter-detecting component 522 of communication device 502 as shown in FIG. 5. Further, as shown in FIG. 10, let portion 1010 of function 1006 correspond to the person gently bouncing his leg or a period of time. Here, the start of the bouncing may be perceived as a triggering event, wherein the detected acceleration is a triggering parameter. When the triggering parameter is detected at a triggering time $t_t$, controlling component 528 initiates a period of detection period threshold, $p_{th}$, stored therein. Any period may be assigned. For purposes of discussion, let detection period threshold, $p_{th}$, in this example be 20 seconds.

Now, suppose in this example that the person stops bouncing his leg at a stop time $t_s$. It is clear from graph 1000 that the triggering parameter did not continue throughout the period set by detection period threshold, $p_{th}$. Such a situation would indicate that communication device 502 is not in an in-vehicle mode of operation. Therefore, there would be no need for further detection of in-vehicle mode detection. This aspect of the present invention therefore preserves power of communication device 502.

Returning to FIG. 8, if the triggering parameter associated with an in-vehicle mode of operation is not detected over the predetermined period (N at S810), method 800 continues to determine whether a triggering parameter associated with an in-vehicle mode of operation is detected (return to S806).

However, if the triggering parameter did continue throughout the period set by detection period threshold, $p_{th}$, communication device 502 would more likely be in an in-vehicle mode of operation. This will be described with reference to FIG. 11.

Figure 11:
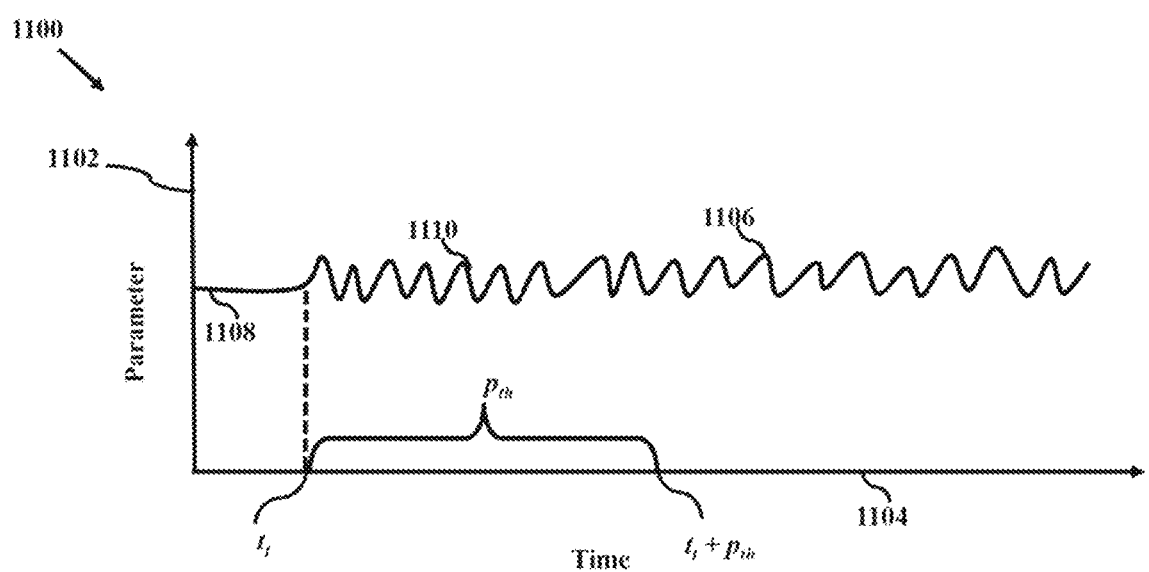
FIG. 11 illustrates another graph of a detected parameter magnitude as a function of time.

FIG. 11 illustrates another graph 1100 of a detected parameter magnitude as a function of time.

As shown in the figure, graph 1100 includes a y-axis 1102 of parameter magnitude, an x-axis 1104 of time and a function 1106. Function 1106 includes a substantially constant portion 1108 and a portion 1110.

For purposes of discussion, let function 1106 correspond to a magnitude of acceleration as detected by parameter-detecting component 522 of communication device 502 as shown in FIG. 5. Further, as shown in FIG. 11, let portion 1010 of function 1006 correspond to vibrations associated with driving a vehicle. Here, the start of the bouncing may be perceived as a triggering event, wherein the detected acceleration, again, is a triggering parameter. When the triggering parameter is detected at a triggering time $t_t$, controlling component 528 initiates a period of detection period threshold, $p_{th}$, stored therein. Again, for purposes of discussion, let detection period threshold, $p_{th}$, in this example be 20 seconds.

Now, suppose in this example that the vibrations detected by communication device 502 continue. It is clear from graph 1100 that the triggering parameter continues throughout the period set by detection period threshold, $p_{th}$. Such a situation would indicate that communication device 502 is likely in an in-vehicle mode of operation. Therefore, there is need for further detection of in-vehicle mode detection.

Returning to FIG. 8, if the triggering parameter associated with an in-vehicle mode of operation is detected over the predetermined period (Y at S810), for example as discussed with reference to FIG. 11, then it is determined whether a verifying parameter of the communication device is detected (S812). For example, returning to FIG. 6, parameter-detecting component 522 may detect a predetermined parameter associated with an in-vehicle mode of operation.

Returning to FIG. 8, if a verifying parameter of the communication device is not detected (N at S814), method 800 continues to look for a triggering parameter (return to S806). Alternatively, if a verifying parameter of the communication device is detected (Y at S812), an in-vehicle signal is generated (S816). For example, identifying component 520 provides an in-vehicle signal.

It should be noted that in a specific example embodiment, the verifying parameter being detected is the velocity of communication device 502. For example, communication device 502 includes a velocity determining component that is operable to determine a velocity based on the generated triggering detector signal.

The velocity may be determined by detection from a parameter-detecting component or by receiving velocity information externally from communication device 502. For example, as shown in FIG. 6, in some embodiments, parameter-detecting component 522 may include a velocity detecting component, a non-limiting example of which includes a component having GPS functionality. In other embodiments, as shown in FIG. 5, controller 528 may access GPS information from network 508 through communication component 524. The GPS information may provide the velocity of the communication device.

Returning to FIG. 8, in this example embodiment, after the velocity of the communication device is detected (S812), it is determined whether the determined velocity is greater than a predetermined threshold (S812). For example, in a non-limiting example embodiment, as shown in FIG. 5, controlling component 528 may have a velocity threshold, $v_{th}$, stored therein. Controlling component 528 may provide the velocity threshold, $v_{th}$, to comparing component 518. Comparing component 518 then compares the determined velocity with the velocity threshold, $v_{th}$, and generates a velocity compared signal. The velocity compared signal is provided to identifying component 520.

If the determined velocity is greater than the velocity threshold, $v_{th}$, then comparing component 518 instructs identifier 520 to generate a signal for an in-vehicle mode of operation. If the detected velocity is less than the velocity threshold, V, then comparator 518 instructs identifying component 520 not to generate a signal for an in-vehicle mode of operation.

Returning to FIG. 8, if the determined velocity is not greater than a predetermined threshold (N at S814), method 800 continues to detect the velocity (return to S812). Alternatively, if the determined velocity is greater than a predetermined threshold (Y at S814), an in-vehicle signal is generated (S816). For example, identifying component 520 provides an in-vehicle signal.

Returning to FIG. 8, after the in-vehicle signal is generated (S816), method 800 stops (S818).

Velocity detection systems and methods, for example those associated GPS functionality, are very useful in determining when a communication device may be operating in an in-vehicle mode. However, such velocity detection systems and methods, for example those associated GPS functionality, are power intensive.

As such, it is important to use such systems and methods sparingly. In accordance with aspects of the present the very useful velocity detection is not used until a triggering event is detected and the triggering event lasts for a predetermined period of time. The use of the triggering event over a predetermined period of time removes false positive identifications of in-vehicle modes of operation without wasting power on detecting velocity. Furthermore, to further preserve energy, some embodiments of the present invention include detecting entry into a vehicle, as a type of pre-triggering event.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A smartphone for use with a vehicle, said smartphone comprising:
   a triggering parameter detecting component operable to:
      detect a first instance of a triggering parameter associated with an in-vehicle mode of operation, the triggering parameter selected from a group consisting of:
         magnetic fields in any of three dimensions, electric fields in any of three dimensions, electro-magnetic fields in any of three dimensions, acceleration in any of three dimensions, angular velocity in any of three dimensions, angular acceleration in any of three dimensions, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in acceleration in any of three dimensions, a change in angular velocity in any of three dimensions, a change in angular acceleration in any of three dimensions, a change in sound, a change in temperature, a change in vibrations in any of three dimensions, a change in pressure in any of three dimensions, a change in biometrics, a change in contents of surrounding atmosphere, and combinations thereof;
      determine a time between the first instance of the triggering parameter and a second instance of the triggering parameter;
      compare the time to a predefined time threshold; and
      generate, based on the comparison of the time to the predefined time threshold, a triggering detector signal indicating the time between the first instance of the triggering parameter and the second instance of the triggering parameter meets or exceeds the predefined time threshold;
   a verifying parameter detecting component operable to:
      in response to the triggering detector signal indicating the time between the first instance of the triggering parameter and the second instance of the triggering parameter meets or exceeds the predefined time threshold, detect a verifying parameter that is different than the triggering parameter; and a mode-determining component operable to generate an in-vehicle mode signal based on the verifying parameter.

2. A device for use with a vehicle, said device comprising:
a triggering parameter detecting component operable to:
  detect vehicle entry parameters associated with entry into the vehicle;
  generate a vehicle entry signal based on the vehicle entry parameters;
  detect, over a predetermined period of time, a triggering parameter based on the vehicle entry signal, the triggering parameter associated with an in-vehicle mode of operation; and
  generate a triggering detector signal based on the triggering parameter over the predetermined period of time;
a velocity determining component operable to determine a velocity of said device based on the triggering detector signal;
a comparing component operable to generate a compared signal when the velocity is greater than a predetermined velocity threshold; and
a mode-determining component operable to generate an in-vehicle mode signal based on the compared signal, wherein said device comprises a controller operable to trigger the velocity determining component to determine the velocity of said device in response to the triggering detector signal.

3. The device of claim 2, wherein said triggering parameter is selected from the group consisting of: magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

4. The device of claim 3, wherein the predetermined period of time is not less than 20 seconds.

5. The device of claim 4, wherein the predetermined velocity threshold is 25 miles per hour.

6. A device comprising:
at least one processor; and
memory storing instructions executable by the at least one processor, wherein the instructions, when executed, cause the device to:
  detecting a first instance of a triggering parameter associated with an in-vehicle mode of operation;
  in response to detecting the first instance of the triggering parameter, define a detection period threshold that is greater than or equal to twenty seconds;
  detecting a second instance of the triggering parameter within the detection period threshold after the first instance of the triggering parameter;
  generate a triggering detector signal based on the detection of the second instance of the triggering parameter within the detection period threshold;
  determine a velocity of the device based on the triggering detector signal; and
  generate an in-vehicle mode signal based on a determination that the velocity of the device is greater than a predetermined velocity threshold.

7. The device of claim 6, wherein the triggering parameter is selected from the group consisting of: magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

8. The device of claim 7, wherein the predetermined velocity threshold is 25 miles per hour.

9. The device of claim 6, wherein the instructions cause the device to:
  detect vehicle entry parameters associated with entry into a vehicle; and
  generate a vehicle entry signal based on the detected vehicle entry parameters.

10. The device of claim 9, wherein the instructions cause the device to detect the first instance of the triggering parameter based on the vehicle entry signal.

11. The device of claim 6, wherein the device comprises a mobile device.

* * * * *

UNITED STATES PATENT AND TRADEMARK OFFICE
CERTIFICATE OF CORRECTION

PATENT NO. : 12,143,893 B2
APPLICATION NO. : 15/806915
DATED : November 12, 2024
INVENTOR(S) : Sascha Simon and Emiliano Miluzzo Page 1 of 1

It is certified that error appears in the above-identified patent and that said Letters Patent is hereby corrected as shown below:

In the Claims

Claim 6:
Column 22, Line 6: --detecting-- should be changed to --detect--
Column 22, Line 11 --detecting-- should be changed to --detect--

Signed and Sealed this
Twenty-seventh Day of May, 2025

Coke Morgan Stewart
*Acting Director of the United States Patent and Trademark Office*